(12) United States Patent
Cha et al.

(10) Patent No.: US 12,219,498 B2
(45) Date of Patent: Feb. 4, 2025

(54) METHOD FOR CONTROLLING TRANSMISSION POWER OF SOUNDING REFERENCE SIGNAL (SRS) BY TERMINAL IN WIRELESS COMMUNICATION SYSTEM, AND DEVICE THEREFOR

(71) Applicant: LG ELECTRONICS INC., Seoul (KR)

(72) Inventors: Hyunsu Cha, Seoul (KR); Sukhyon Yoon, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 526 days.

(21) Appl. No.: 17/633,730

(22) PCT Filed: Aug. 14, 2020

(86) PCT No.: PCT/KR2020/010879
§ 371 (c)(1),
(2) Date: Feb. 8, 2022

(87) PCT Pub. No.: WO2021/034043
PCT Pub. Date: Feb. 25, 2021

(65) Prior Publication Data
US 2022/0312342 A1    Sep. 29, 2022

Related U.S. Application Data

(60) Provisional application No. 62/932,565, filed on Nov. 8, 2019, provisional application No. 62/887,765, filed on Aug. 16, 2019.

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0051* (2013.01); *H04W 52/242* (2013.01); *H04W 52/36* (2013.01); *H04W 56/001* (2013.01)

(58) Field of Classification Search
CPC ............. H04W 52/146; H04W 52/242; H04W 52/283; H04W 52/325; H04W 52/36;
(Continued)

(56) References Cited

U.S. PATENT DOCUMENTS 11,445,408 B2 *   9/2022   Li ......................... H04L 1/0003
11,463,964 B2 *  10/2022   Li ........................... H04L 5/001
(Continued)

FOREIGN PATENT DOCUMENTS

| WO | 2012177207 | 12/2012 |
|----|-----------|---------|
| WO | 2018204887 | 11/2018 |
| WO | 2019001344 | 1/2019 |

OTHER PUBLICATIONS

European Patent Office Application Serial No. 20855739.7, Extended Search Report dated Jul. 20, 2022, 11 pages.
(Continued)

*Primary Examiner* — Liton Miah
(74) *Attorney, Agent, or Firm* — LEE, HONG, DEGERMAN, KANG & WAIMEY

(57) ABSTRACT

Disclosed is a method for controlling the transmission power of a sounding reference signal (SRS) by a terminal in a wireless communication system. In particular, the method comprises: connecting to a serving cell; receiving an RS resource for acquiring path loss used for the transmission power of an SRS; determining measurement for the path loss on the basis of the RS resource; and controlling the transmission power of the SRS on the basis of the determination on the measurement, wherein the RS resource is related to a neighbor cell, a measurement value of the path loss is used
(Continued)

US 12,219,498 B2

Page 2 to control the transmission power, on the basis that measurement for the RS resource has succeeded, and information related to a power setting, acquired from the serving cell can be used to control the transmission power, on the basis that the measurement for the RS resource has failed.

16 Claims, 19 Drawing Sheets

(51) Int. Cl.
*H04W 52/24* (2009.01)
*H04W 52/36* (2009.01)
*H04W 56/00* (2009.01)

(58) Field of Classification Search
CPC ... H04W 52/40; H04W 52/50; H04W 56/001; H04L 5/0051; H04L 5/0053; H04L 5/0091; H04B 7/0695
See application file for complete search history.

(56) References Cited

U.S. PATENT DOCUMENTS

| | | | | |
|---|---|---|---|---|
| 11,496,970 B2* | 11/2022 | Li | ...................... | H04B 7/06964 |
| 11,516,758 B2* | 11/2022 | Kwak | .................. | H04W 56/001 |
| 2014/0328299 A1* | 11/2014 | Kalhan | .................. | H04W 72/21 |
| | | | | 370/329 |
| 2018/0191666 A1* | 7/2018 | Rahman | .............. | H04L 61/4541 |
| 2018/0324853 A1* | 11/2018 | Jeon | ...................... | H04W 74/08 |
| 2019/0069322 A1* | 2/2019 | Davydov | .............. | H04L 5/0091 |
| 2019/0159100 A1* | 5/2019 | Liou | ...................... | H04B 7/088 |
| 2022/0217643 A1* | 7/2022 | Zhou | ..................... | H04W 52/42 |
| 2023/0045308 A1* | 2/2023 | Guan | ..................... | H04L 5/0051 |

OTHER PUBLICATIONS

CATT, "Physical-layer procedures to support UE/gNB measurements," 3GPP TSG-RAN WG1 Meeting #97, R1-1906308, May 2019, 11 pages.

Qualcomm Incorporated, "Summary#2 of 7.2.10.3: PHY procedures for positioning measurements," 3GPP TSG-RAN WG1 #96bis, R1-1905811, Apr. 2019, 12 pages.

Huawei, HiSilicon, "Physical layer procedure for NR positioning," 3GPP TSG-RAN WG1 #97, R1-1906055, May 2019, 16 pages.

PCT International Application No. PCT/KR2020/010879, Written Opinion of the International Search Report dated Nov. 20, 2020, 8 pages.

* cited by examiner (A) CONTROL-PLANE PROTOCOL STACK (B) USER-PLANE PROTOCOL STACK (a)

(b)

(a)

(b)

METHOD FOR CONTROLLING TRANSMISSION POWER OF SOUNDING REFERENCE SIGNAL (SRS) BY TERMINAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/010879, filed on Aug. 14, 2020, which claims the benefit of U.S. Provisional Application No. 62/887,765, filed on Aug. 16, 2019, and 62/932,565, filed on Nov. 8, 2019, the contents of which are all incorporated by reference herein in their entirety.

TECHNICAL FIELD

The present disclosure relates to a method of controlling transmission power of a sounding reference signal (SRS) by a user equipment (UE) and apparatus therefor, and more particularly, a method for controlling SRS transmission power when a UE fails to acquire path loss and apparatus therefor.

BACKGROUND ART

As more communication devices require greater communication traffic, necessity for a mobile broadband communication, which is enhanced compared to a legacy radio access technology (RAT), is emerging. Massive MTC (machine type communication) providing a user with various services anywhere and at any time by connecting many devices and objects is one of important issues to be considered in the next generation communication system. Moreover, discussion on designing a communication system in consideration of a service sensitive to reliability and latency is in progress. In particular, discussion on the introduction of a next generation RAT considering eMBB (enhanced mobile broadband communication), massive MTC (mMTC), URLLC (ultra-reliable and low latency communication), and the like is in progress. In the present disclosure, for clarity, the next generation RAT is referred to as a New RAT.

DISCLOSURE

Technical Problem

An object of the present disclosure is to provide a method of controlling transmission power of a sounding reference signal (SRS) by a user equipment (UE) in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of controlling transmission power of a sounding reference signal (SRS) by a user equipment (UE) in a wireless communication system. The method may include: receiving a synchronization signal/physical broadcast channel (SS/PBCH) block including a primary synchronization signal (PSS), a secondary synchronization signal (SSS), and a physical broadcast channel (PBCH); performing access to a serving cell based on system information included in the PBCH of the SS/PBCH block; receiving a reference signal (RS) resource for obtaining path loss to be used for the transmission power of the SRS; determining measurement regarding the path loss based on the RS resource; and controlling the transmission power of the SRS based on the determination of the measurement. The RS resource may be related to a neighbor cell. Based on success of the measurement for the RS resource, a measurement value of the path loss may be used to control the transmission power, and based on failure of the measurement for the RS resource, information related to a power configuration obtained from the serving cell may be used to control the transmission power.

In this case, based on the failure of the measurement for the RS resource, the SRS may not be transmitted.

In addition, based on the failure of the measurement for the RS resource, the transmission power may be controlled by applying a power offset to SRS transmission power for the serving cell.

The SRS may be related to positioning of the UE.

The method may further include: receiving spatial relation information related to the RS resource, and the spatial relation information may include information regarding the neighbor cell.

Based on the failure of the measurement for the RS resource, the information regarding the neighbor cell included in the spatial relation information may be used to determine a transmission beam of the SRS.

In another aspect of the present disclosure, there is provided a UE configured to control transmission power of an SRS in a wireless communication system. The UE may include: at least one transceiver; at least one processor; and at least one memory operably connected to the at least one processor and configured to store instructions that, when executed, cause the at least one processor to perform operations. The operations may include: receiving an SS/PBCH block including a PSS, a SSS, and a PBCH; performing access to a serving cell based on system information included in the PBCH of the SS/PBCH block; receiving an RS resource for obtaining path loss to be used for the transmission power of the SRS; determining measurement regarding the path loss based on the RS resource; and controlling the transmission power of the SRS based on the determination of the measurement. The RS resource may be related to a neighbor cell. Based on success of the measurement for the RS resource, a measurement value of the path loss may be used to control the transmission power, and based on failure of the measurement for the RS resource, information related to a power configuration obtained from the serving cell may be used to control the transmission power.

In this case, based on the failure of the measurement for the RS resource, the SRS may not be transmitted.

In addition, based on the failure of the measurement for the RS resource, the transmission power may be controlled by applying a power offset to SRS transmission power for the serving cell.

The SRS may be related to positioning of the UE.

The operations may further include: receiving spatial relation information related to the RS resource, and the spatial relation information may include information regarding the neighbor cell.

Based on the failure of the measurement for the RS resource, the information regarding the neighbor cell included in the spatial relation information may be used to determine a transmission beam of the SRS.

In another aspect of the present disclosure, there is provided an apparatus configured to control transmission power of an SRS in a wireless communication system. The apparatus may include: at least one transceiver; at least one processor; and at least one memory operably connected to the at least one processor and configured to store instructions that, when executed, cause the at least one processor to perform operations. The operations may include: receiving an SS/PBCH block including a PSS, an SSS, and a PBCH; performing access to a serving cell based on system information included in the PBCH of the SS/PBCH block; receiving an RS resource for obtaining path loss to be used for the transmission power of the SRS; determining measurement regarding the path loss based on the RS resource; and controlling the transmission power of the SRS based on the determination of the measurement. The RS resource may be related to a neighbor cell. Based on success of the measurement for the RS resource, a measurement value of the path loss may be used to control the transmission power, and based on failure of the measurement for the RS resource, information related to a power configuration obtained from the serving cell may be used to control the transmission power.

In another aspect of the present disclosure, there is provided a method of supporting control of transmission power of an SRS by a network node in a wireless communication system. The method may include: transmitting an SS/PBCH block including a PSS, an SSS, and a PBCH; transmitting an RS resource related to path loss to be used for the transmission power of the SRS; and receiving the SRS. The RS resource may be related to a neighbor cell, and the RS resource may be used to measure the path loss. Based on success of the measurement regarding the path loss for the RS resource, the transmission power of the SRS may be determined based on a measurement value of the path loss, and based on failure of the measurement regarding the path loss for the RS resource, the transmission power of the SRS may be determined based on information related to a power configuration from a serving cell.

In another aspect of the present disclosure, there is provided a network node configured to support control of transmission power of an SRS in a wireless communication system. The network node may include: at least one transceiver; at least one processor; and at least one memory operably connected to the at least one processor and configured to store instructions that, when executed, cause the at least one processor to perform operations. The operations may include: transmitting an SS/PBCH block including a PSS, an SSS, and a PBCH; transmitting an RS resource related to path loss to be used for the transmission power of the SRS; and receiving the SRS. The RS resource may be related to a neighbor cell, and the RS resource may be used to measure the path loss. Based on success of the measurement regarding the path loss for the RS resource, the transmission power of the SRS may be determined based on a measurement value of the path loss, and based on failure of the measurement regarding the path loss for the RS resource, the transmission power of the SRS may be determined based on information related to a power configuration from a serving cell.

In a further aspect of the present disclosure, there is provided a computer-readable storage medium configured to store at least one computer program including instructions that, when executed by at least one processor, cause the at least one processor to perform operations for a UE. The operations may include: receiving an SS/PBCH block including a PSS, a SSS, and a PBCH; performing access to a serving cell based on system information included in the PBCH of the SS/PBCH block; receiving an RS resource for obtaining path loss to be used for the transmission power of the SRS; determining measurement regarding the path loss based on the RS resource; and controlling the transmission power of the SRS based on the determination of the measurement. The RS resource may be related to a neighbor cell. Based on success of the measurement for the RS resource, a measurement value of the path loss may be used to control the transmission power, and based on failure of the measurement for the RS resource, information related to a power configuration obtained from the serving cell may be used to control the transmission power.

Advantageous Effects

According to the present disclosure, a user equipment (UE) may appropriately transmit a sounding reference signal (SRS) by controlling the power of the SRS.

It will be appreciated by persons skilled in the art that the effects that could be achieved with the present disclosure are not limited to what has been particularly described hereinabove and other advantages of the present disclosure will be more clearly understood from the following detailed description.

BEST MODE

Figure 1:
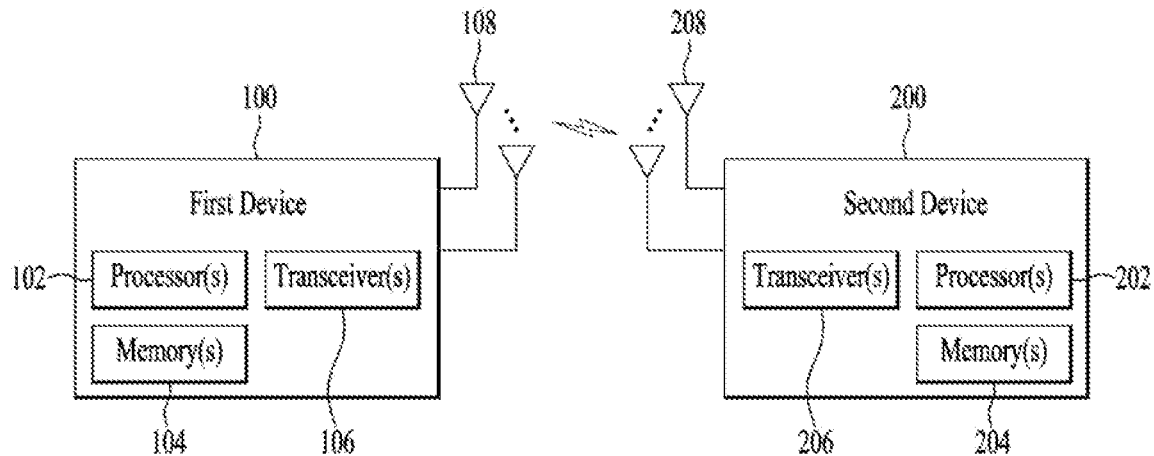
FIGS. 1 to 4 illustrate examples of various wireless devices to which embodiments of the present disclosure are applied.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3$^{rd}$ generation partnership project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates wireless devices applicable to the present disclosure.

Referring to FIG. 1, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in various embodiments of the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In various embodiments of various embodiments of the present disclosure, the wireless device may represent the communication modem/circuit/chipset.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

The processor(s) 102 may control the transceiver(s) 106 to receive an RS resource for obtaining path loss used for transmission power of an SRS. The processor(s) 102 may determine measurement regarding the path loss based on the RS resource. The processor(s) 102 may control the transmission power of the SRS based on the determination of the measurement. In this case, specific methods of operating the processor(s) 102 may be based on the following embodiments.

In addition, a description will be also given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204.

The processor(s) 202 may control transceiver(s) 206 to transmit an RS resource related to path loss used for transmission power of an SRS. The processor(s) 202 may control the transceiver(s) 206 to receive the SRS. In this case, specific methods of operating the processor(s) 202 may be based on the following embodiments.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in various embodiments of the present disclosure.

The one or more processors 102 and 202 may generate messages, control information, data, or information according to the description, functions, procedures, proposals, methods, and/or operational flowcharts disclosed in various embodiments of the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in various embodiments of the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in various embodiments of the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the various embodiments of present disclosure may be implemented using firmware or software, and the firmware or software may be configured to include the modules, procedures, or functions. Firmware or software configured to perform the description, functions, procedures, proposals, methods, and/or operational flowcharts disclosed in various embodiments of the present disclosure may be included in the one or more processors 102 and 202 or stored in the one or more memories 104 and 204 so as to be driven by the one or more processors 102 and 202. The description, functions, procedures, proposals, and/or methods disclosed in various embodiments of the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of various embodiments of the present disclosure, to one or more other devices. The one or more transceivers 106 and 206 may receive user data, control information, and/or radio signals/channels, mentioned in the description, functions, procedures, proposals, methods, and/or operational flowcharts disclosed in various embodiments of the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in various embodiments of the present disclosure, through the one or more antennas 108 and 208. In various embodiments of the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 2:
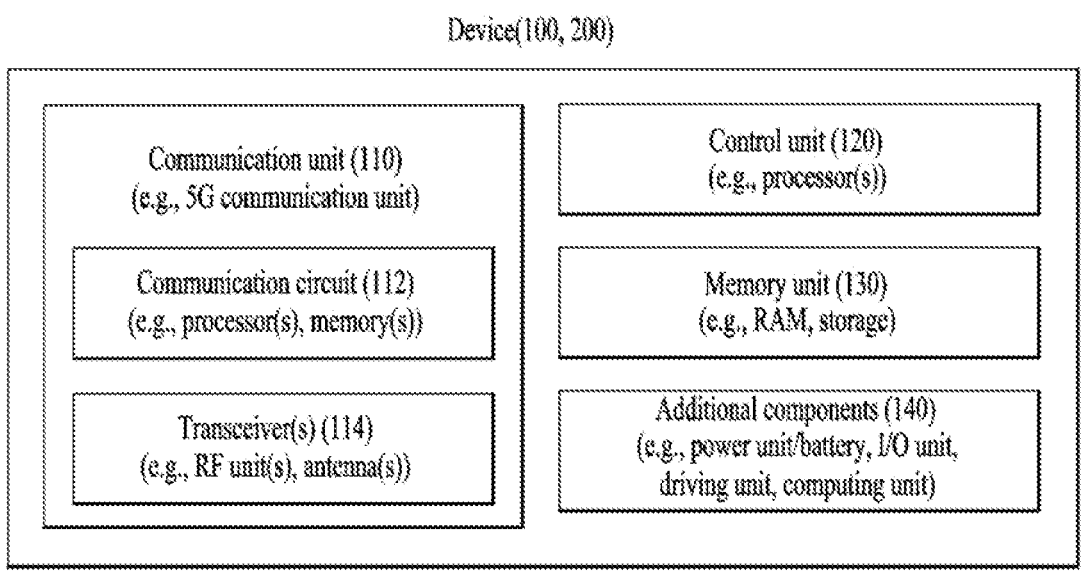

FIG. 2 illustrates another exemplary a wireless device applied to the present disclosure. The wireless device may be implemented in various forms according to a use case/service (refer to FIG. 24).

Referring to FIG. 2, wireless devices 100 and 200 may correspond to the wireless devices 100 and 200 of FIG. 1 and may be configured with various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 1. For example, the transceiver(s) 114 may include the one or more transceivers 106 and 206 and/or the one or more antennas 108 and 208 of FIG. 1. The control unit 120 is electrically connected to the communication unit 110, the memory 130, and the additional components 140 and controls overall operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) through the communication unit 110 via a wireless/wired interface or store, in the memory unit 130, information received from the outside (e.g., other communication devices) through the communication unit 110 via the wireless/wired interface. Therefore, a specific of operation the control unit 120 and programs/code/commands/information stored in the memory unit 130 according to the present disclosure may corresponding to at least one operation of the processors 102 and 202 and at least one operation of the memories 104 and 204 illustrated in FIG. 1.

The additional components 140 may be configured in various ways according to the type of wireless device. For example, the additional components 140 may include at least one of a power unit/battery, input/output (I/O) unit, a driving unit, or a computing unit. The wireless device may be implemented in the form of, but not limited to, the robot (100 $a$ of FIG. 24), the vehicles (100 $b$-1 and 100 $b$-2 of FIG. 24), the XR device (100 $c$ of FIG. 24), the hand-held device (100 $d$ of FIG. 24), the home appliance (100 $e$ of FIG. 24), the IoT device (100 $f$ of FIG. 24), a digital broadcasting terminal, a hologram device, a public safety device, an MTC device, a medical device, a FinTech device (or a financial machine), a security device, a climate/environment device, the AI server/device (400 of FIG. 24), a B S (200 of FIG. 24), a network node, or the like. The wireless device may be used in a mobile or fixed place according to a use case/service.

In FIG. 2, all of the various elements, components, units/portions, and/or modules in the wireless devices 100 and 200 may be inter-connected through a wired interface or at least a part thereof may be wirelessly inter-connected through the communication unit 110. For example, in each of the wireless devices 100 and 200, the control unit 120 and the communication unit 110 may be connected by wire, and the control unit 120 and first units (e.g., 130 and 140) may be connected wirelessly through the communication unit 110. Each element, component, unit/portion, and/or module in the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a RAM, a DRAM, a ROM, a flash memory, a volatile memory, a non-volatile memory, and/or a combination thereof.

Now, a detailed description will be given of an implementation example of the devices illustrated in FIG. 2 with reference to the drawings.

Figure 3:
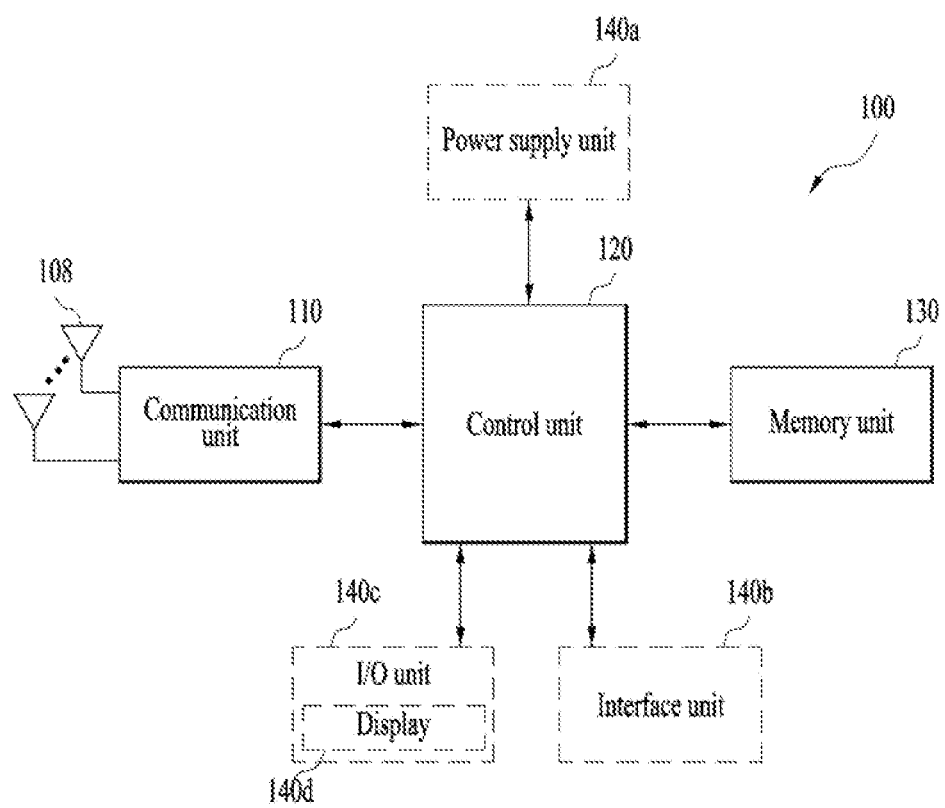

FIG. 3 illustrates a hand-held device applied to the present disclosure. The hand-held device may include a smartphone, a smart pad, a wearable device (e.g., a smart watch or smart glasses), or a portable computer (e.g., a laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 3, a hand-held device 100 may include an antenna unit 108, a communication unit 110, a control unit 120, a memory unit 130, a power supply unit 140 $a$, an interface unit 140 $b$, and an I/O unit 140 $c$. The antenna unit 108 may be configured as a part of the communication unit 110. Blocks 110 to 130/140 $a$ to 140 $c$ correspond to the blocks 110 to 130/140 of FIG. 2, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/code/commands needed to drive the hand-held device 100. The memory unit 130 may store input/output data/information. The power supply unit 140 $a$ may supply power to the hand-held device 100 and include a wired/wireless charging circuit, a battery, and so on. The interface unit 140 *b* may support connection between the hand-held device 100 and other external devices. The interface unit 140 *b* may include various ports (e.g., an audio I/O port and a video I/O port) for connection to external devices. The I/O unit 140 *c* may input or output video information/signals, audio information/signals, data, and/or information input by a user. The I/O unit 140 *c* may include a camera, a microphone, a user input unit, a display unit 140 *d*, a speaker, and/or a haptic module.

For example, in the case of data communication, the I/O unit 140 *c* may acquire information/signals (e.g., touch, text, voice, images, or video) input by the user and the acquired information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals to original information/signals. The restored information/signals may be stored in the memory unit 130 and output as various types (e.g., text, voice, images, video, or haptic) through the I/O unit 140 *c*.

Figure 4:
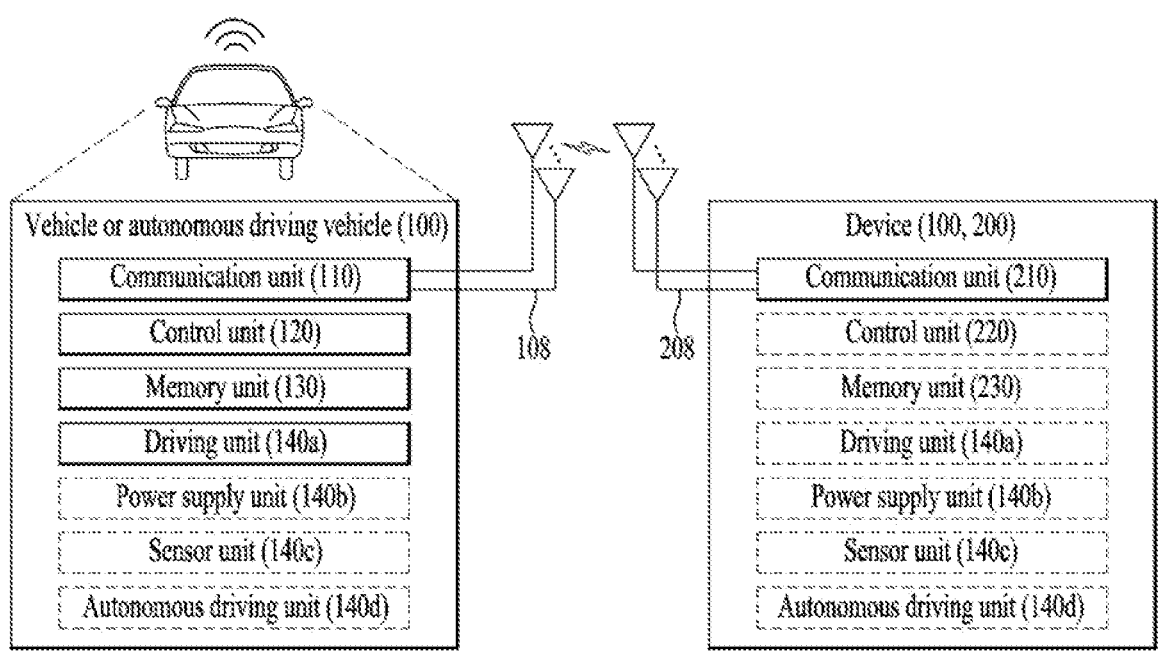

FIG. 4 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 4, a vehicle or autonomous driving vehicle 100 may include an antenna unit 108, a communication unit 110, a control unit 120, a driving unit 140 *a*, a power supply unit 140 *b*, a sensor unit 140 *c*, and an autonomous driving unit 140 *d*. The antenna unit 108 may be configured as a part of the communication unit 110. The blocks 110/130/140 *a* to 140 *d* correspond to the blocks 110/130/140 of FIG. 2, respectively.

The communication unit 110 may transmit and receive signals (e.g., data and control signals) to and from external devices such as other vehicles, BSs (e.g., gNBs and road side units), and servers. The control unit 120 may perform various operations by controlling components of the vehicle or the autonomous driving vehicle 100. The control unit 120 may include an ECU. The driving unit 140 *a* may cause the vehicle or the autonomous driving vehicle 100 to drive on a road. The driving unit 140 *a* may include an engine, a motor, a powertrain, a wheel, a brake, a steering device, and so on. The power supply unit 140 *b* may supply power to the vehicle or the autonomous driving vehicle 100 and include a wired/wireless charging circuit, a battery, and so on. The sensor unit 140 *c* may acquire information a vehicle state, ambient environment information, user information, and so on. The sensor unit 140 *c* may include an inertial measurement unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140 *d* may implement technology for maintaining a lane on which the vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on from an external server. The autonomous driving unit 140 *d* may generate an autonomous driving path and a driving plan based on the obtained data. The control unit 120 may control the driving unit 140 *a* to drive the vehicle or the autonomous driving vehicle 100 along the autonomous driving path according to the driving plan (e.g., speed/direction control). In the middle of autonomous driving, the communication unit 110 may aperiodically or periodically acquire the latest traffic information data from the external server and acquire surrounding traffic information data from neighboring vehicles. In the middle of autonomous driving, the sensor unit 140 *c* may obtain information about a vehicle state and/or surrounding environment information. The autonomous driving unit 140 *d* may update the autonomous driving path and the driving plan based on the newly obtained data/information. The communication unit 110 may transfer information about a vehicle position, the autonomous driving path, and the driving plan to the external server. The external server may predict traffic information data using AI technology based on the information collected from vehicles or autonomous driving vehicles, and provide the predicted traffic information data to the vehicles or the autonomous driving vehicles.

Figure 5:
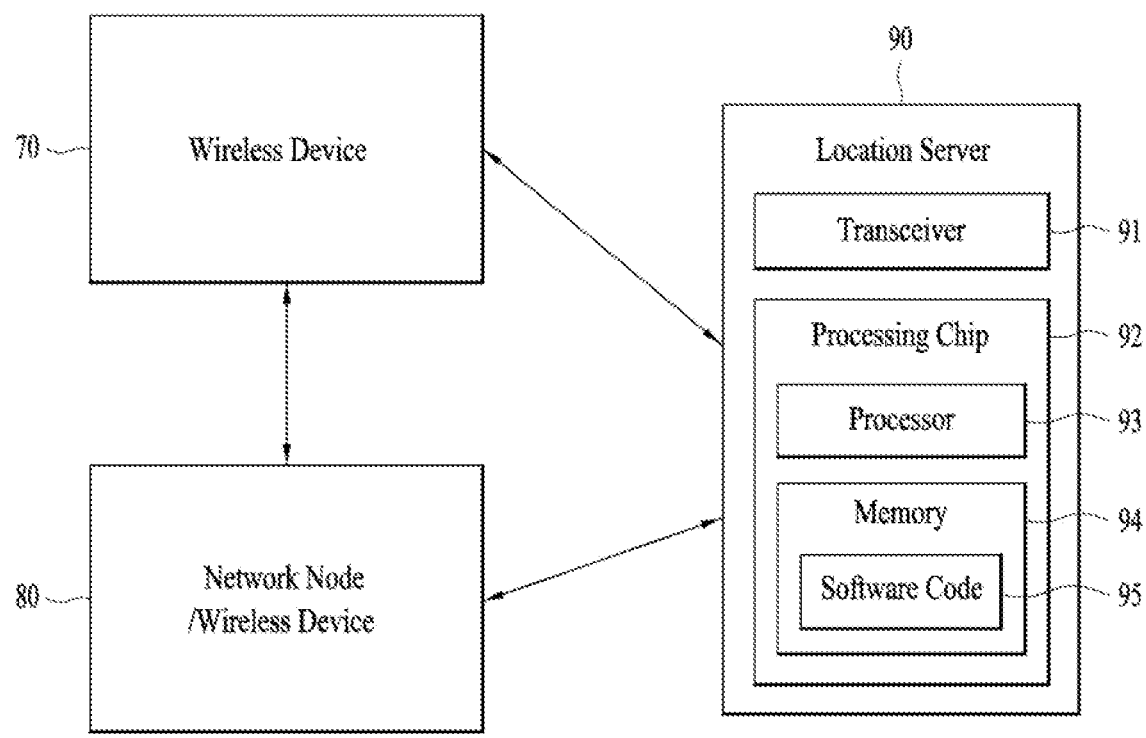
FIG. 5 illustrates an exemplary location server to which embodiments of the present disclosure are applied.

To implement embodiments of the present disclosure, a location server 90 shown in FIG. 5 may be included. Here, the location server 90 may be logically or physically connected to a wireless device 70 and/or a network node 80. The wireless device 70 may be the first wireless device 100 of FIG. 1 and/or the wireless devices 100/200 of FIG. 2, and the network node 80 may be the second wireless device 100 of FIG. 1 and/or the wireless devices 100/200 of FIG. 2.

The location server 90 may be an access and mobility management function (AMF), a location management function (LMF), an enhanced serving mobile location center (E-SMLC), and/or a secure user plane location (SUPL) location platform (SLP), but the location server 90 is not limited thereto. That is, any communication device may be used as the location server 90 as long as the device is capable of serving as the location server 90 to implement embodiments of the present disclosure. Although the location server 90 has the name "location server" for convenience of description, the location server 90 may be implemented as a chip other than a server. When the location server 90 is implemented as a chip, all the functions of the location server 90, which will be described later, may be performed as well.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 19 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor such as the processor 93, the memory 94 allows the processor 93 to perform some or all of the processes controlled by the processor 93 of FIG. 5 or stores software code 95 including instructions for performing the embodiments described in this specification.

Figure 6:
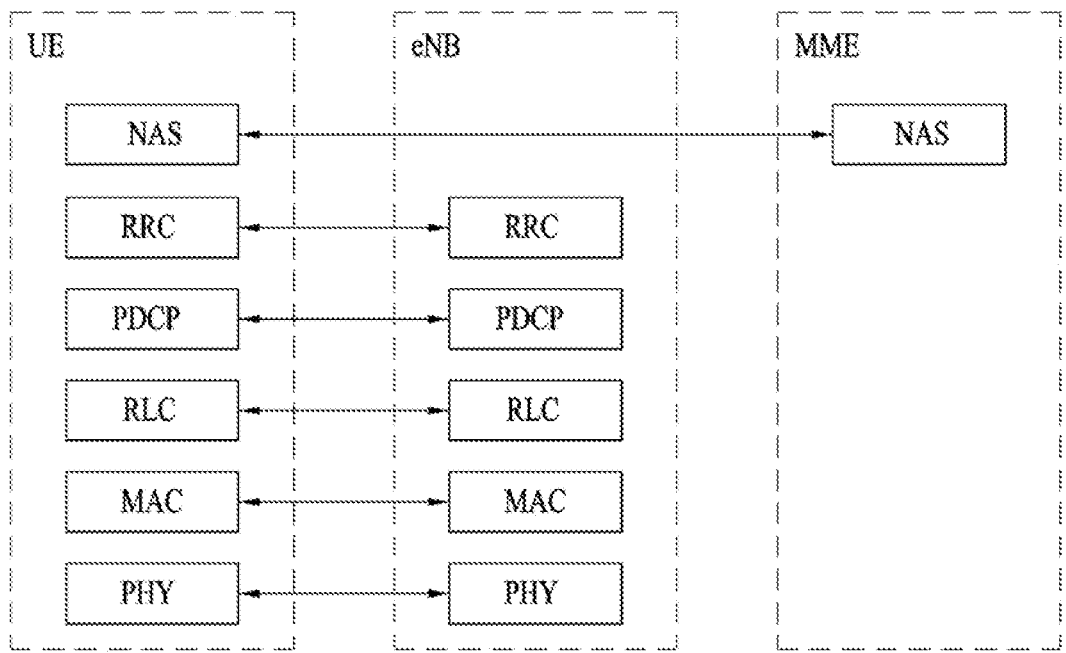
FIG. 6 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 6:
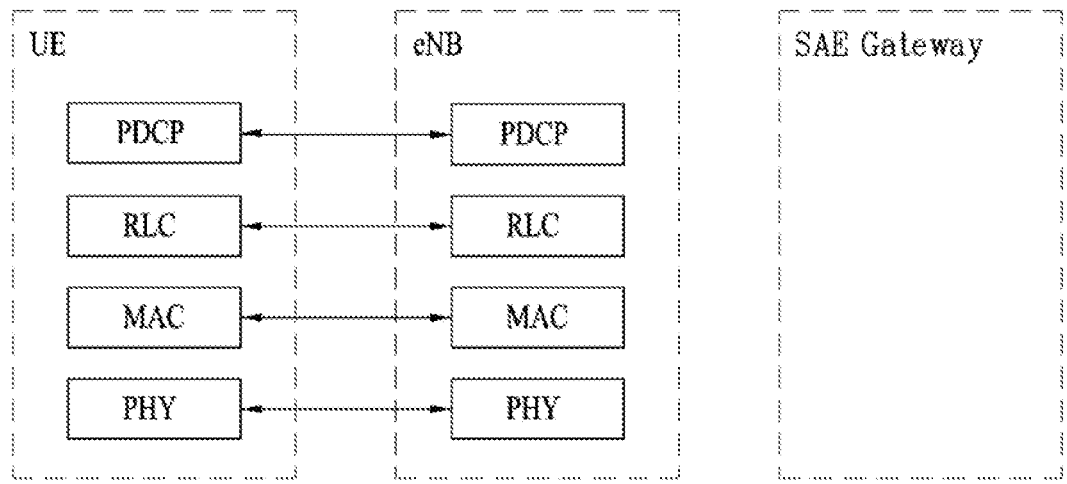

FIG. 6 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 7:
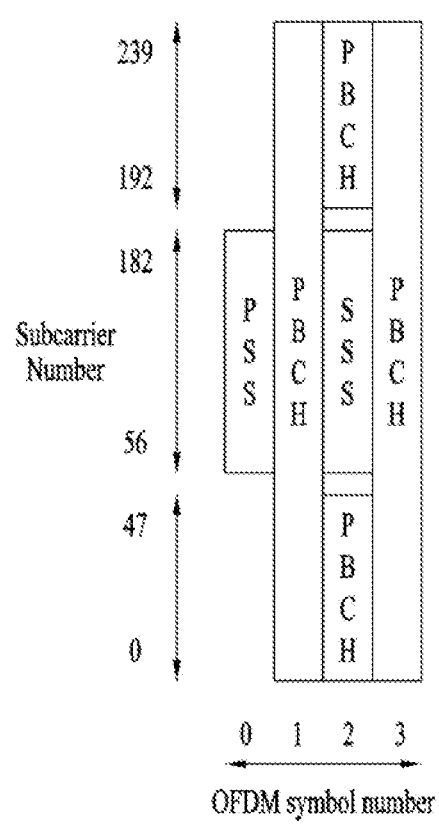
FIG. 7 and FIG. 12 are diagrams illustrating the composition of a synchronization signal/physical broadcast channel (SS/PBCH) block and a method of transmitting an SS/PBCH block.

FIG. 7 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 7, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS RES.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 1 below.

TABLE 1

| | Type of Signals | Operations |
|---|---|---|
| $1^{st}$ step | PSS | * SS/PBCH block (SSB) symbol timing acquisition<br>* Cell ID detection within a cell ID group<br>(3 hypothesis) |
| $2^{nd}$ Step | SSS | * Cell ID group detection (336 hypothesis) |
| $3^{rd}$ Step | PBCH DMRS | * SSB index and Half frame (HF) index(Slot and frame boundary detection) |

TABLE 1-continued

| Type of Signals | | Operations |
| --- | --- | --- |
| 4$^{th}$ Step | PBCH | * Time information (80 ms, System Frame Number (SFN), SSB index, HF)* Remaining Minimum System Information (RMSI) Control resource set (CORESET)/Search space configuration |
| 5$^{th}$ Step | PDCCH and PDSCH | * Cell access information* RACH configuration |

Figure 8:
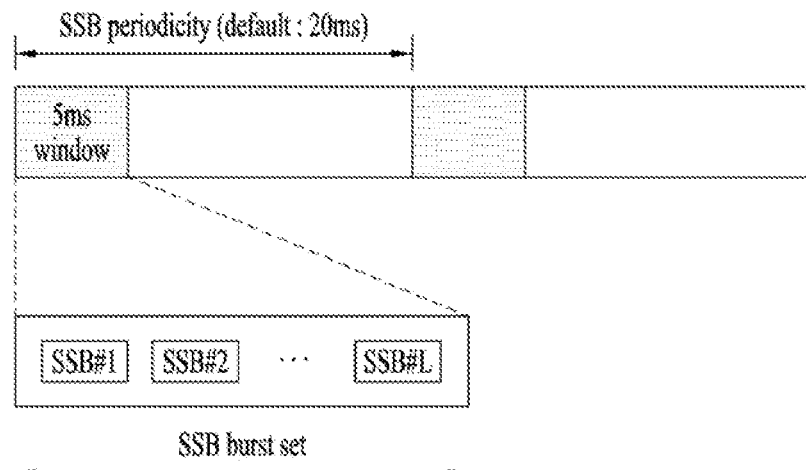

FIG. 8 illustrates SSB transmission.

SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHZ, L=4
For frequency range from 3 GHz to 6 GHz, L=8
For frequency range from 6 GHz to 52.6 GHz, L=64

The time position of an SSB candidate in the SS burst set may be defined according to the subcarrier spacing (SCS) as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHZ, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHZ, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 9:
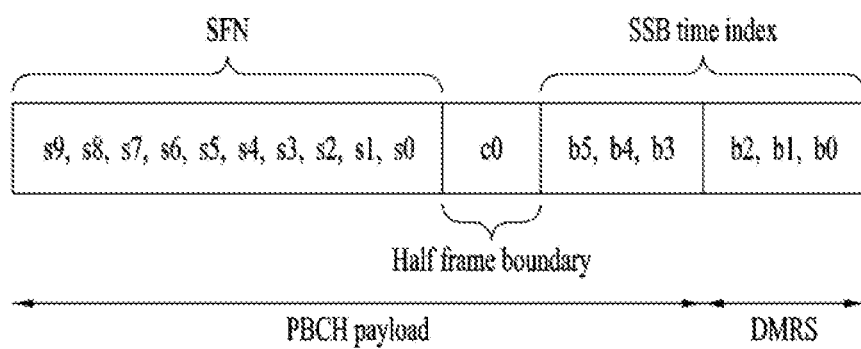
Figure 10:
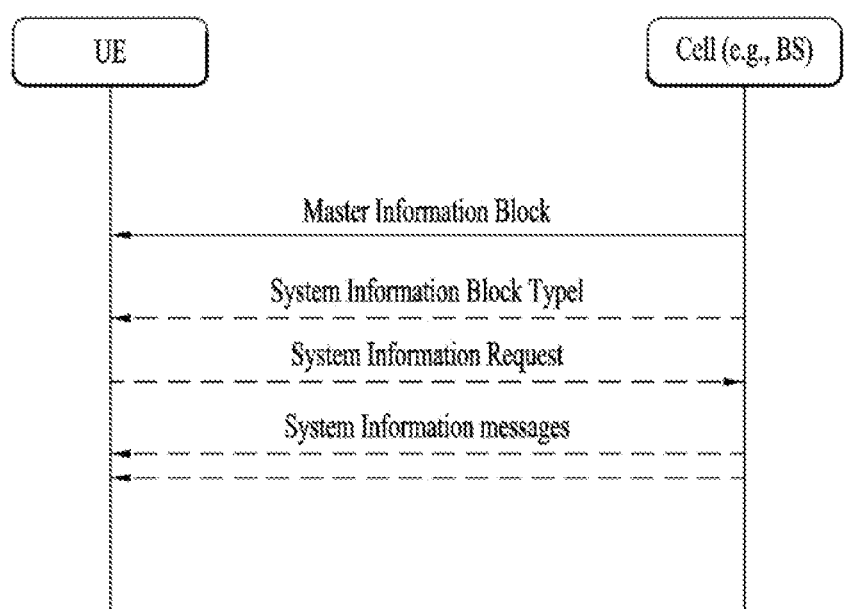

FIG. 9 illustrates acquisition of DL time synchronization information by the UE.

The UE may acquire DL synchronization by detecting an SSB. The UE may identify the structure of an SSB burst set based on the index of the detected SSB and thus detect the boundary of a symbol/slot/half-frame. The number of a frame/half-frame to which the detected SSB belongs to may be identified by SFN information and half-frame indication information.

Specifically, the UE may acquire 10-bit SFN system information (s0 to s9) from a PBCH. 6 bits of the 10-bit SFN information are obtained from a master information block (MIB), and the remaining 4 bits are obtained from a PBCH TB.

Thereafter, the UE may acquire 1-bit half-frame indication information (c0). When the carrier frequency is 3 GHz or below, the half-frame indication information may be implicitly signaled by a PBCH DMRS. The PBCH DMRS uses one of 8 PBCH DMRS sequences to indicate 3-bit information. Therefore, when L=4, the remaining one bit except for bits indicating an SSB index among three bits that may be indicated by the 8 PBCH DMRS sequences may be used for the half-frame indication.

Finally, the UE may acquire the SSB index based on the DMRS sequence and PBCH payload. SSB candidates are indexed from 0 to L−1 in time order within the SSB burst set (i.e., half-frame). When L=8 or L=64, three least significant bits (LSBs) (b0 to b2) of the SSB index may be indicated by 8 different PBCH DMRS sequences. When L=64, three most significant bits (MSBs) (b3 to b5) of the SSB index may be indicated by the PBCH. When L=2, two LSBs (b0 and b1) of the SSB index may be indicated by four different PBCH DMRS sequences. When L=4, the remaining one bit (b2) except for the bits indicating the SSB index among the three bits may be used for the half-frame indication.

System Information Acquisition

Figure 18:
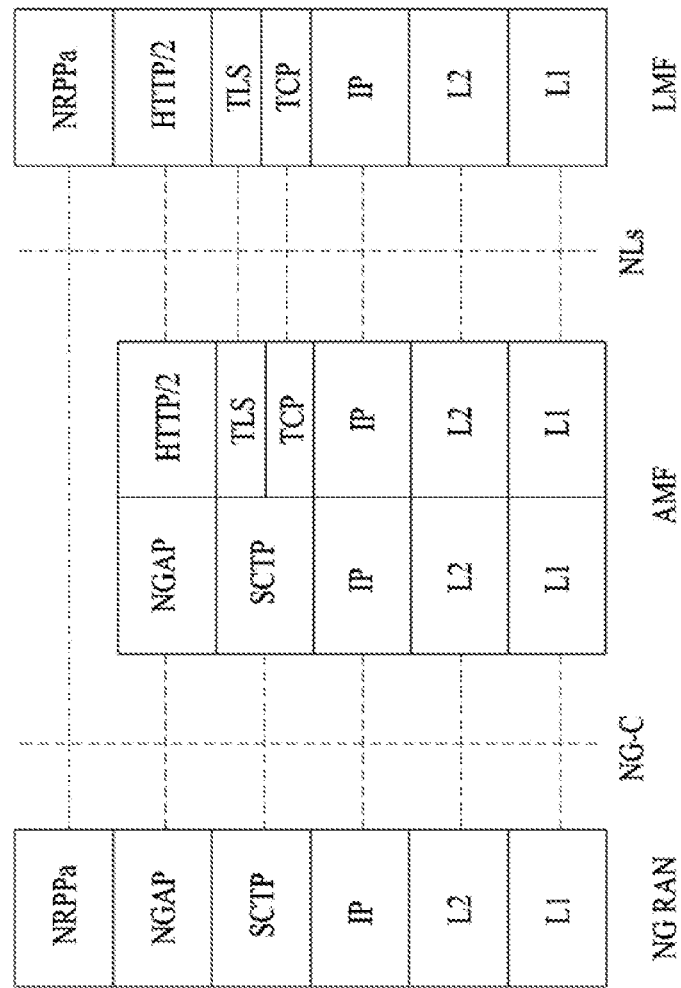
FIG. 18 is a diagram illustrating an exemplary protocol layer used to support NR positioning protocol A (NRPPa) protocol data unit (PDU) transfer.

FIG. 18 illustrates a system information (SI) acquisition procedure. The UE may acquire access stratum/non-access stratum (AS/NAS) information in the SI acquisition procedure. The SI acquisition procedure may be performed by UEs in RRC_IDLE, RRC_INACTIVE, and RRC_CONNECTED states.

SI may be divided into an MIB and a plurality of system information blocks (SIBs). The MIB and the plurality of SIBs may be further divided into minimum SI and other SI. The minimum SI may include the MIB and system information block 1 (SIB1), carrying basic information required for initial access and information required to acquire the other SI. SIB1 may also be referred to as remaining minimum system information (RMSI). Details thereof will be described in the following.

The MIB includes information/parameters related to reception of SIB1 (SystemInformationBlockType1) and is transmitted on the PBCH of an SSB. The UE assumes that a half-frame including the SSB is repeated every 20 ms during initial cell selection. The UE may determine based on the MIB whether there is a control resource set (CORESET) for a Type0-PDCCH common search space. The Type0-PDCCH common search space is a kind of PDCCH search space and used to transmit a PDCCH that schedules an SI message. If the Type0-PDCCH common search space exists, the UE may determine (1) a plurality of contiguous RBs and one or more consecutive symbols included in the CORESET and (ii) a PDCCH occasion (e.g., a time-domain location for PDCCH reception, based on information (e.g., pdcch-ConfigSIB1) in the MIB. If the Type0-PDCCH common search space does not exist, pdcch-ConfigSIB1 provides information on a frequency location at which the SSB/SIB1 exists and information pm a frequency range where there are no SSB/SIB1.

SIB1 includes information related to availability and scheduling (e.g., transmission periodicity, SI-window size, etc.) of the remaining SIBs (hereinafter referred to as SIBx where x is an integer more than or equal to 2). For example, SIB1 may indicate whether SIBx is periodically broadcast or provided at the request of the UE in an on-demand manner. When SIBx is provided in an on-demand manner, SIB1 may include information necessary for the UE to send an SI request. SIB1 is transmitted over a PDSCH, a PDCCH scheduling SIB1 is transmitted in the Type0-PDCCH common search space, and SIB1 is transmitted over the PDSCH indicated by the PDCCH.

SIBx is included in the SI message and transmitted on the PDSCH. Each SI message is transmitted within a periodically occurring time window (i.e., SI-window).

Beam Alignment

Figure 11:
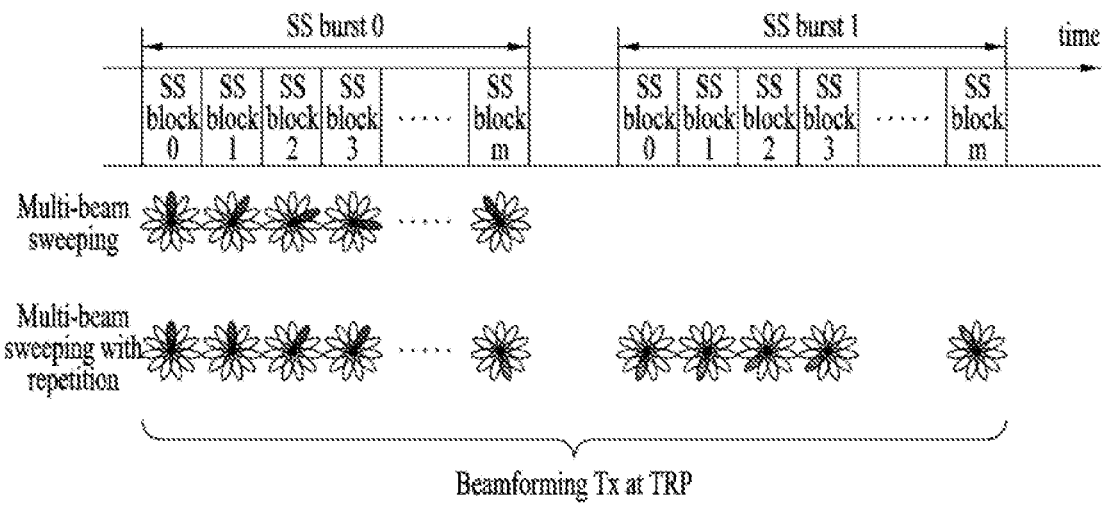

FIG. 11 illustrates multi-beam transmission in SSBs.

Beam sweeping refers to changing the beam (direction) of a radio signal over time by a transmission reception point (TRP) (e.g., BS/cell) (hereinafter, the terms beam and beam direction are interchangeably used). SSBs may be transmitted periodically by beam sweeping. In this case, SSB indices are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of contiguous SSBs. The maximum number of times that the SSB is transmitted in an SSB burst set, L may have a value of 4, 8, or 64 depending on the frequency band of a carrier. Accordingly, the maximum number of SSB beams in the SSB burst set may be given according to the frequency band of the carrier as follows.

For frequency range up to 3 GHZ, Max number of beams=4

For frequency range from 3 GHz to 6 GHZ, Max number of beams=8

For frequency range from 6 GHz to 52.6 GHz, Max number of beams=64

When multi-beam transmission is not applied, the number of SSB beams is 1.

When the UE attempts to initially access the BS, the UE may align beams with those of the BS based on the SSB. For example, the UE identifies the best SSB after performing SSB detection. Thereafter, the UE may transmit a RACH preamble to the BS on a PRACH resource linked/corresponding to the index (i.e., beam) of the best SSB. The SSB may be used to align beams between the BS and UE after the initial access.

Channel Measurement and Rate-Matching

Figure 12:
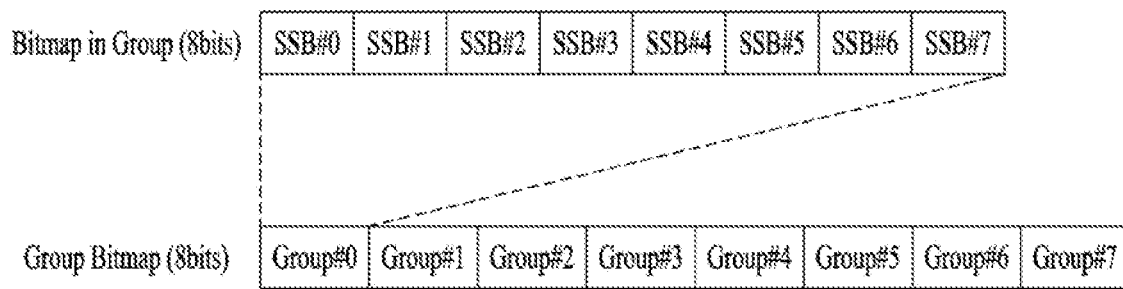

FIG. 12 illustrates a method of notifying an actually transmitted SSB (SSB_tx).

A maximum of L SSBs may be transmitted in an SSB burst set, and the number and positions of actually transmitted SSBs may vary for each BS/cell. The number and positions of actually transmitted SSBs may be used for rate-matching and measurement, and information about actually transmitted SSBs may be indicated as follows.

When the number and positions of actually transmitted SSBs are related to rate-matching, the information may be indicated by UE-specific RRC signaling or RMSI. The UE-specific RRC signaling includes a full bitmap (e.g., of length L) for frequency ranges below and above 6 GHz. The RMSI includes a full bitmap for frequency ranges below 6 GHz and a compressed bitmap for frequency ranges above 6 GHz. Specifically, the information about actually transmitted SSBs may be indicated by group-bitmap (8 bits)+intra-group bitmap (8 bits). Resources (e.g., REs) indicated by the UE-specific RRC signaling or RMSI may be reserved for SSB transmission, and a PDSCH and/or PUSCH may be rate-matched in consideration of the SSB resources.

When the number and positions of actually transmitted SSBs are related to measurement, the network (e.g., BS) may indicate an SSB set to be measured within a measurement period if the UE is in the RRC connected mode. The SSB set may be indicated for each frequency layer. If no SSB set is indicated, a default SSB set may be used. The default SSB set includes all SSBs within the measurement period. The SSB set may be indicated by a full bitmap (e.g., of length L) of RRC signaling. When the UE is in the RRC idle mode, the default SSB set is used.

Random Access (RA) Procedure

Figure 13:
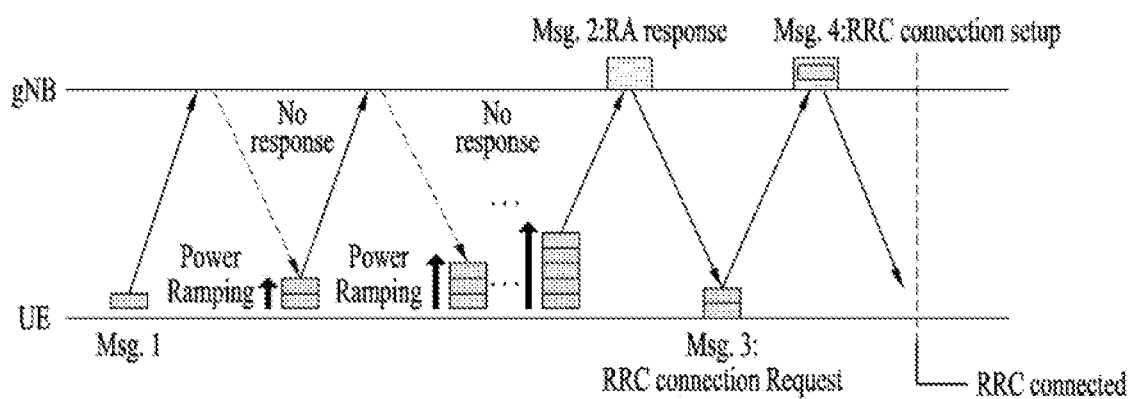
FIG. 13 is a diagram illustrating a random access procedure.

FIG. 13 illustrates an exemplary random access procedure. In particular, FIG. 13 shows a contention-based RA procedure.

First, the UE may transmit a random access preamble over a PRACH in UL as Msg1 of the random access procedure.

Random access preamble sequences of two different lengths are supported. Long sequence length 839 is applied with SCSs of 1.25 and 5 kHz, and short sequence length 139 is applied with SCSs of 15, 30, 60 and 120 KHz.

Multiple preamble formats are defined by one or more RACH OFDM symbols and different cyclic prefixes (and/or guard times). A RACH configuration for the initial bandwidth of a primary cell (Pcell) may be included in system information of the cell and provided to the UE. The RACH configuration includes information on the SCS of the PRACH, available preambles, preamble formats, and the like. The RACH configuration includes information on association between SSBs and RACH (time-frequency) resources. The UE transmits the random access preamble on a RACH time-frequency resource associated with a detected or selected SSB.

The threshold of SSBs may be configured by the network for association with RACH resources. The RACH preamble may be transmitted or retransmitted based on SSB(s) having reference signal received power (RSRP) measured based thereon satisfying the threshold. For example, the UE may select one of the SSB(s) that satisfy the threshold and transmit or retransmit the RACH preamble based on a RACH resource associated with the selected SSB. For example, upon retransmission of the RACH preamble, the UE may reselect one of the SSB(s) and retransmit the RACH preamble based on a RACH resource associated with the reselected SSB. That is, the RACH resource for retransmission of the RACH preamble may be the same as and/or different from the RACH resource for transmission of the RACH preamble.

When the BS receives a random access preamble from the UE, the BS transmits a random access response (RAR) message (Msg2) to the UE. A PDCCH scheduling a PDSCH that carries the RAR is cyclic redundancy check (CRC) scrambled with a random access radio network temporary identifier (RA-RNTI) and then transmitted. Upon detecting the PDCCH CRC-scrambled with the RA-RNTI, the UE may receive the RAR from the PDSCH that is scheduled by DCI carried on the PDCCH. The UE checks whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmission power for retransmitting the preamble based on the most recent transmission power, power increment, and power ramping counter.

The RAR information may include a preamble sequence transmitted by the UE, a temporary cell-RNTI (TC-RNTI) allocated by the BS to the UE that has attempted random access, and UL transmit time alignment information, UL transmission power adjustment information, and UL radio resource allocation information. If the UE receives the RAR information for itself on the PDSCH, the UE may obtain information timing advance information for UL synchronization, an initial UL grant, a TC-RNTI. The timing advance information may be used to control a UL signal transmission timing. To better align PUSCH/PUCCH transmission by the UE with the subframe timing at the network, the network (e.g., BS) may obtain the timing advance information based on timing information detected from a PRACH preamble received from the UE and transmit the timing advance information to the UE. The UE may transmit a UL signal over a UL shared channel based on the RAR information as Msg3 of the RACH procedure. Msg3 may include an RRC connection request and a UE identifier. In response to Msg3, the network may transmit Msg4, which may be treated as a contention resolution message on DL. Upon receiving Msg4, the UE may enter the RRC_CONNECTED state.

A contention-free random access procedure may be used when the UE is handed over to another cell or BS or when requested by a command from the BS. The basic steps of the contention-free random access procedure are similar to those of the contention-based random access procedure. However, in the contention-free random access procedure, the BS allocates a preamble to be used by the UE (hereinafter, dedicated random access preamble) to the UE, unlike the contention-based random access procedure in which the UE arbitrarily selects a preamble to be used from among a plurality of random access preambles. Information on the dedicated random access preamble may be included in an RRC message (e.g., handover command) or provided to the UE through a PDCCH order. When the random access procedure is initiated, the UE transmits the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is also referred to as an Msg3 PUSCH. The content of an RAR UL grant may start at the MSB and end at the LSB, and the content may be given as shown in Table 2.

TABLE 2

| RAR UL grant field | Number of bits |
|---|---|
| Frequency hopping flag | 1 |
| Msg3 PUSCH frequency resource allocation | 12 |
| Msg3 PUSCH time resource allocation | 4 |

TABLE 2-continued

| RAR UL grant field | Number of bits |
|---|---|
| Modulation and coding scheme (MCS) | 4 |
| Transmit power control (TPC) for Msg3 PUSCH | 3 |
| CSI request | 1 |

A TPC command is used to determine the transmission power of the Msg3 PUSCH. For example, the TPC command may be interpreted as shown in Table 6.

TABLE 3

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free RACH procedure, a CSI request field in the RAR UL grant indicates whether the UE includes an aperiodic CSI report in corresponding PUSCH transmission. An SCS for Msg3 PUSCH transmission is provided by an RRC parameter. The UE may transmit a PRACH and an Msg3 PUSCH on the same UL carrier of the same serving cell. A UL BWP for Msg3 PUSCH transmission is indicated by system information block 1 (SIB1).

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_i}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is represented as an integer multiple of $N_{SC}^{RB}$ as the largest value among DL bandwidth configurations, and $N_{SC}^{RB}$ denotes the size of a resource block (RB) in the frequency domain, for example, 12 subcarriers.

In addition, c(i) denotes a pseudo-random sequence and may be initialized by [Equation 2] below.

$$C_{init} = 2^{28} \cdot \lfloor N_{ID}^{PRS}/512 \rfloor + 2^{10} \cdot (7 \cdot (n_s+1) + l + 1) \cdot (2 \cdot (N_{ID}^{PBS} \mod 512) + 1) + 2 \cdot (N_{ID}^{PRS} \mod 512) + N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 14:
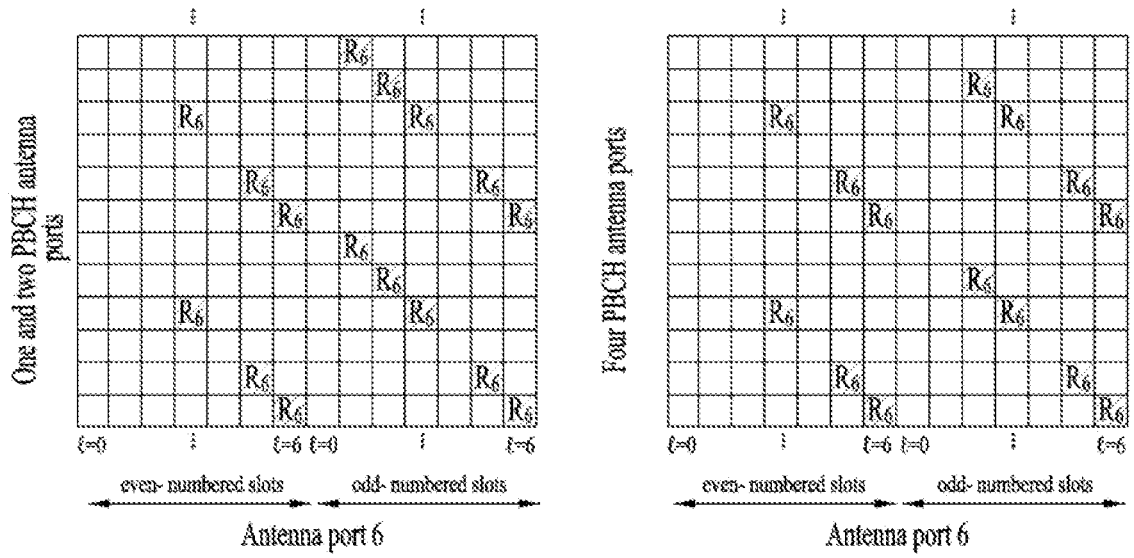
FIG. 14 illustrates an exemplary pattern to which a positioning reference signal (PRS) is mapped in a subframe in LTE system.
Figure 14:
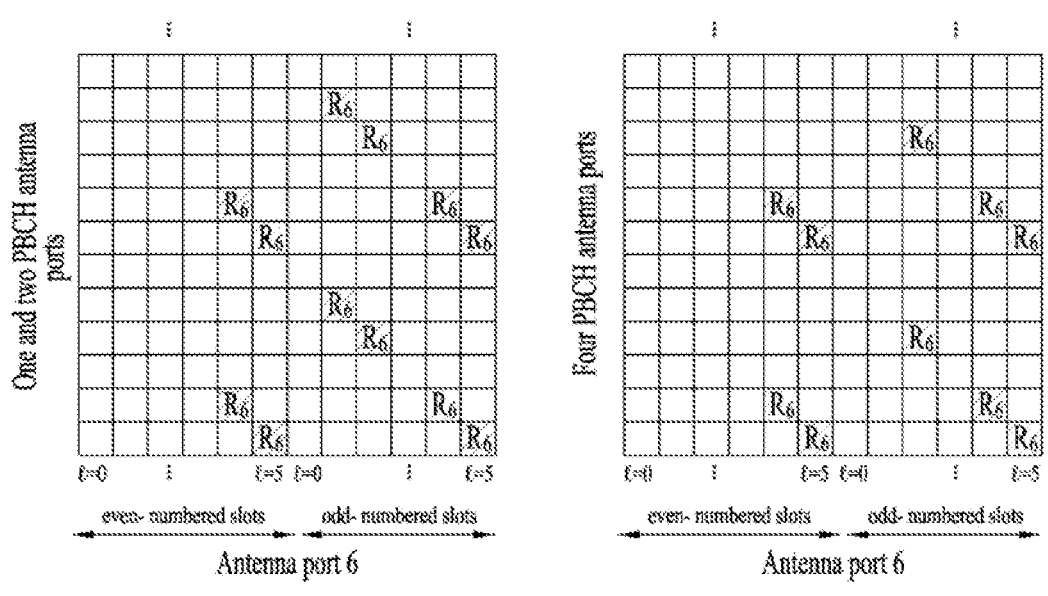

FIG. 14 illustrates an exemplary pattern to which a PRS is mapped in a subframe. As illustrated in FIG. 14, the PRS may be transmitted through an antenna port 6. FIG. 14(a) illustrates mapping of the PRS in the normal CP and FIG. 14(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 4] below.

TABLE 4

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 |  | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 15:
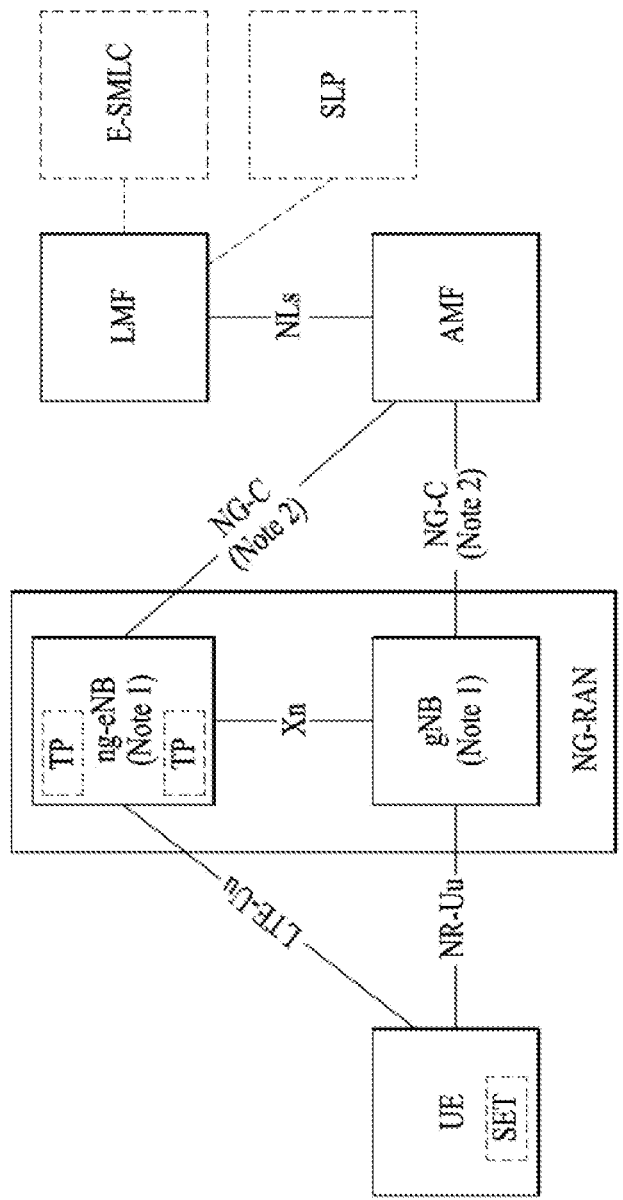
FIG. 15 and FIG. 16 are diagrams illustrating the architecture of a system for measuring the position of a UE and a procedure of measuring the position of the UE.

FIG. 15 illustrates the architecture of a 5G system applicable to positioning of a UE connected to a next generation-radio access network (NG-RAN) or an E-UTRAN.

Referring to FIG. 15, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 16:
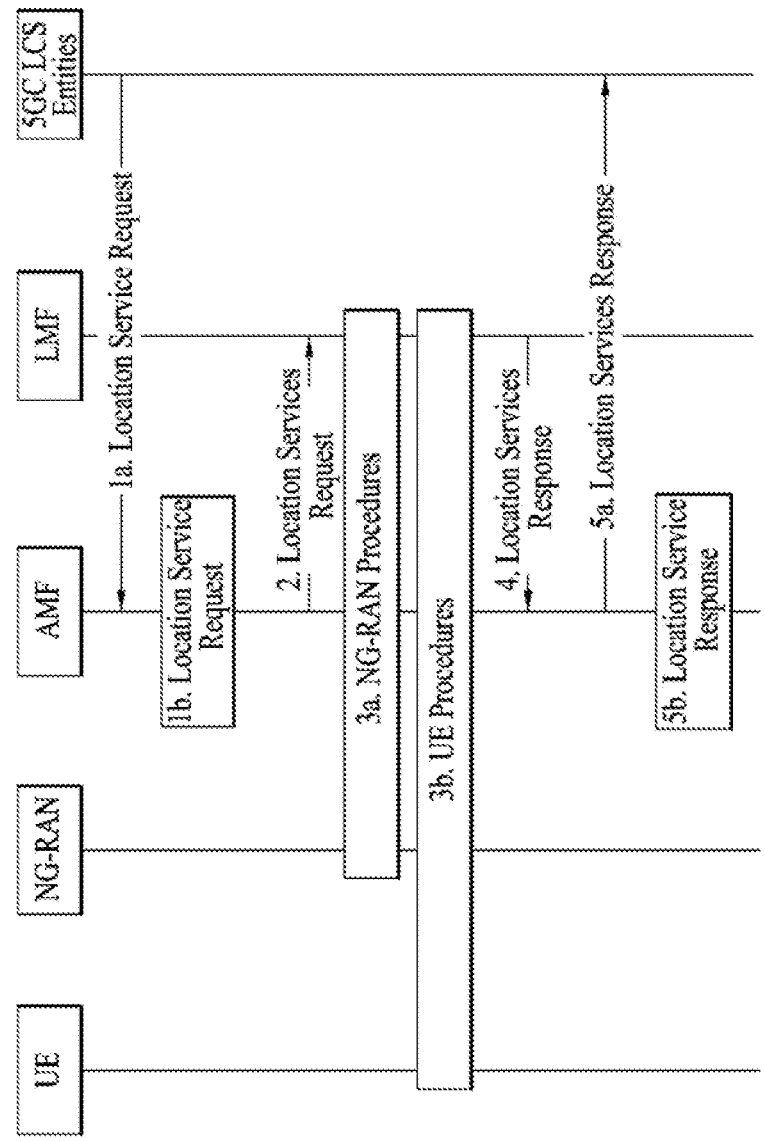

FIG. 16 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 16. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 16 has been initiated by step 1b, the AMF may use the location service response in order to provide a location service related to an emergency call.

Protocol for Location Measurement (1) LTE Positioning Protocol (LPP)

Figure 17:
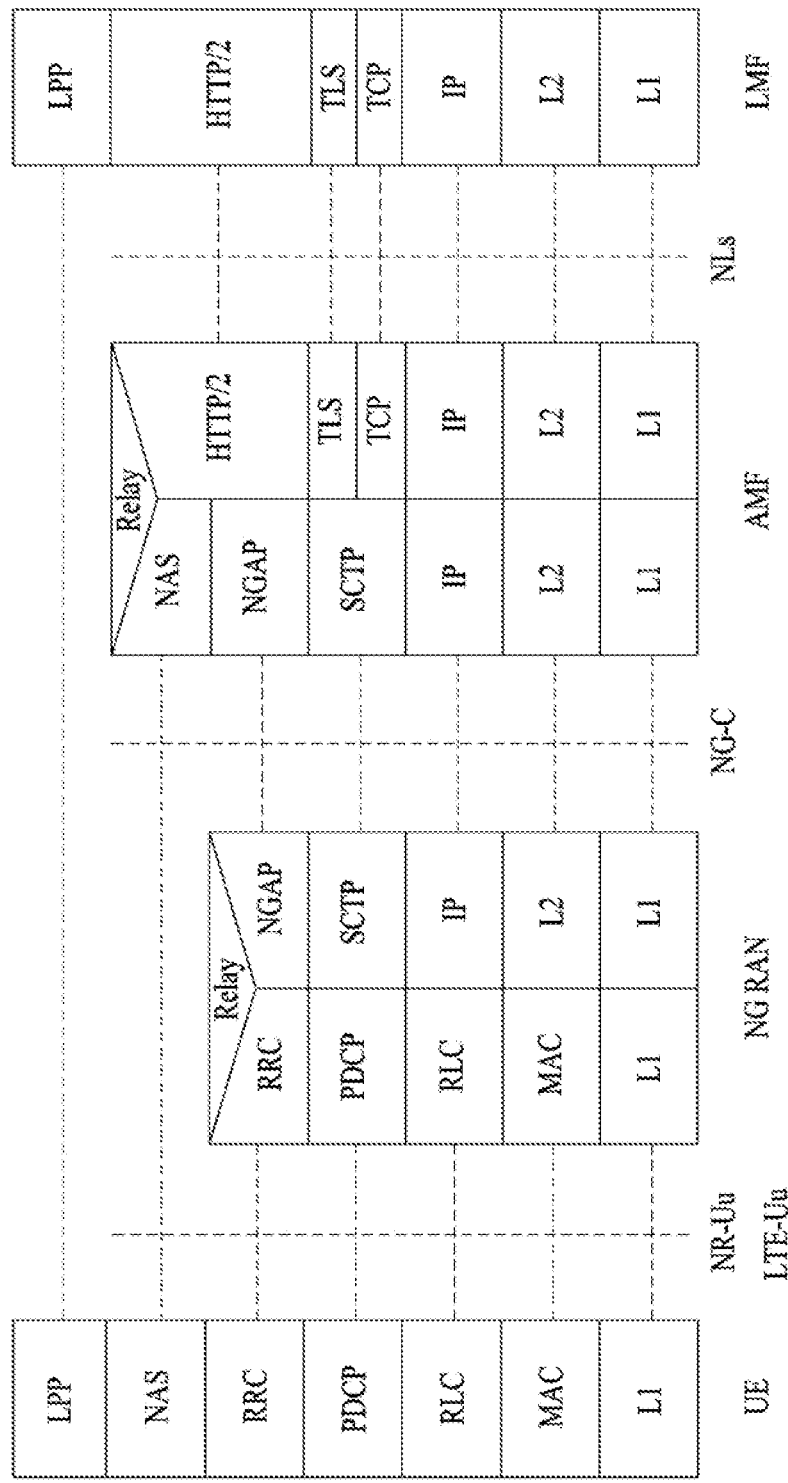
FIG. 17 illustrates an exemplary protocol layer used to support LTE positioning protocol (LPP) message transfer.

FIG. 17 illustrates an exemplary protocol layer used to support LPP message transfer between an LMF and a UE. An LPP protocol data unit (PDU) may be carried in a NAS PDU between an MAF and the UE. Referring to FIG. 17, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

FIG. 18 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 19:
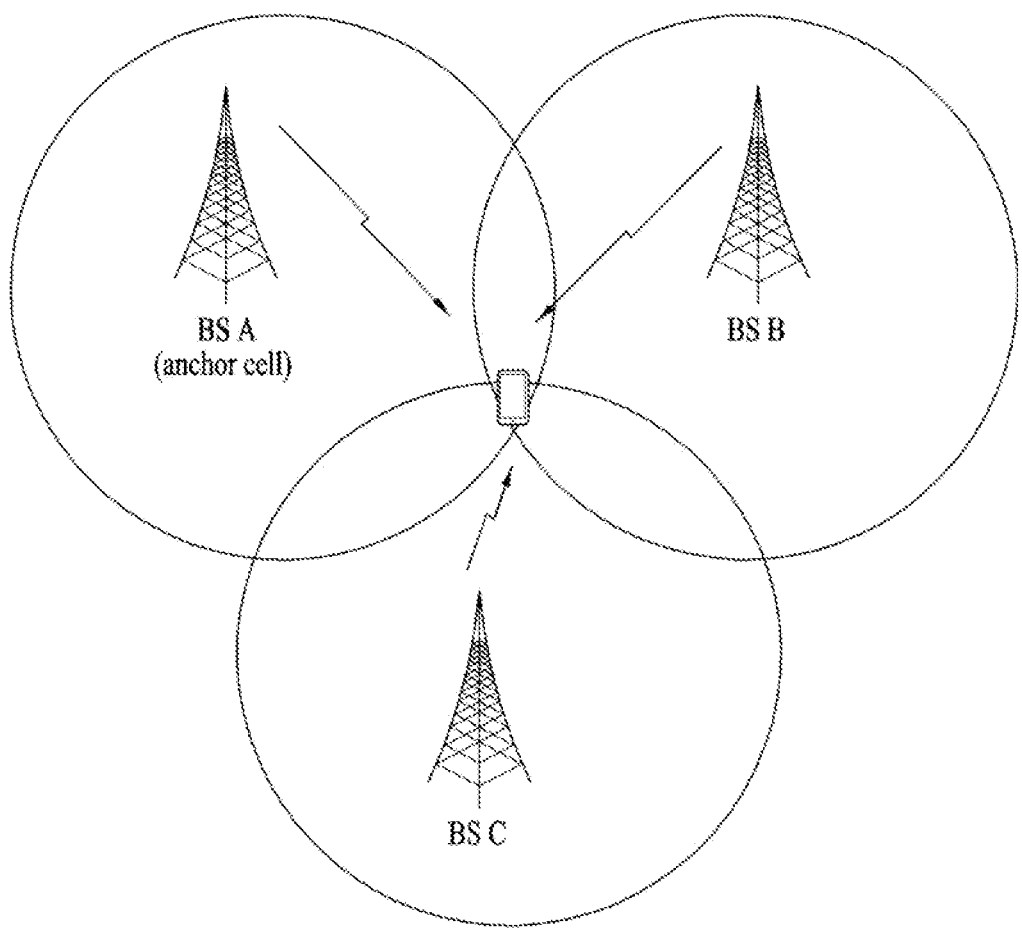
FIG. 19 is a diagram illustrating an embodiment of an observed time difference of arrival (OTDOA) positioning method.

FIG. 19 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$-\frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad [\text{Equation 3}]$$

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The CNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

(4) Multi Round Trip Time (RTT) (Multi-Cell RTT)

Compared to OTDOA that requires fine synchronization (e.g., at the nano-second level) between TPs in the network, RTT requires only coarse TRP (e.g., BS) timing synchronization although RTT is also based on time of arrival (TOA) measurements as in OTDOA.

Figure 20:
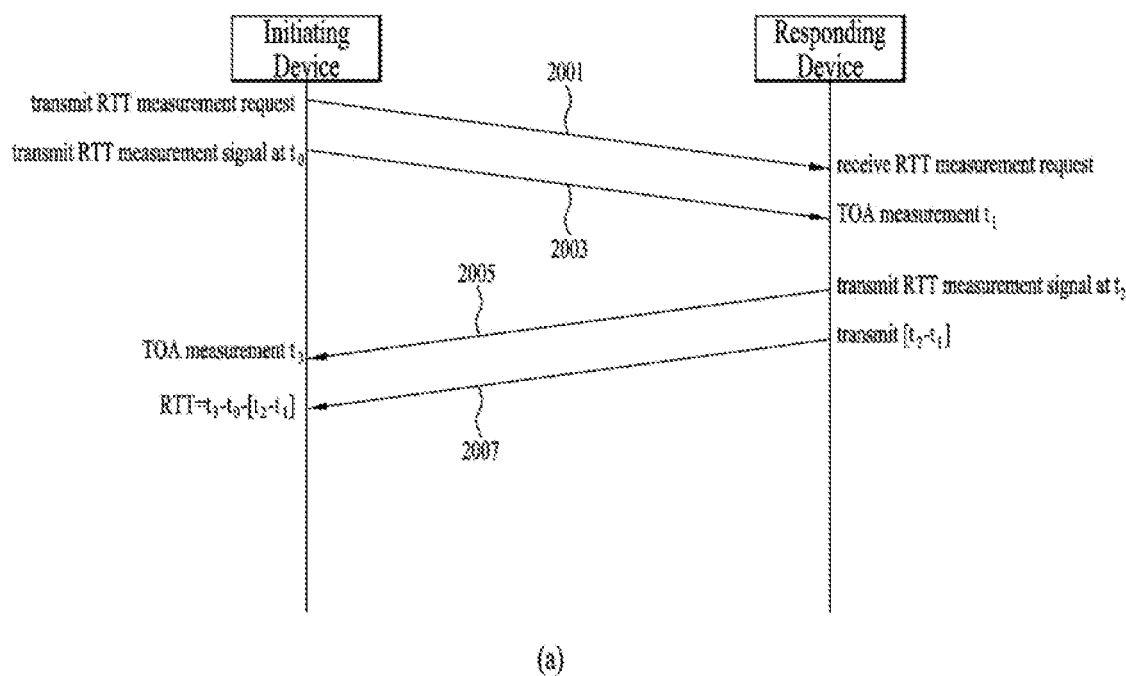
FIG. 20 is a diagram for explaining an embodiment of a multi round trip time (RTT) positioning method.
Figure 20:
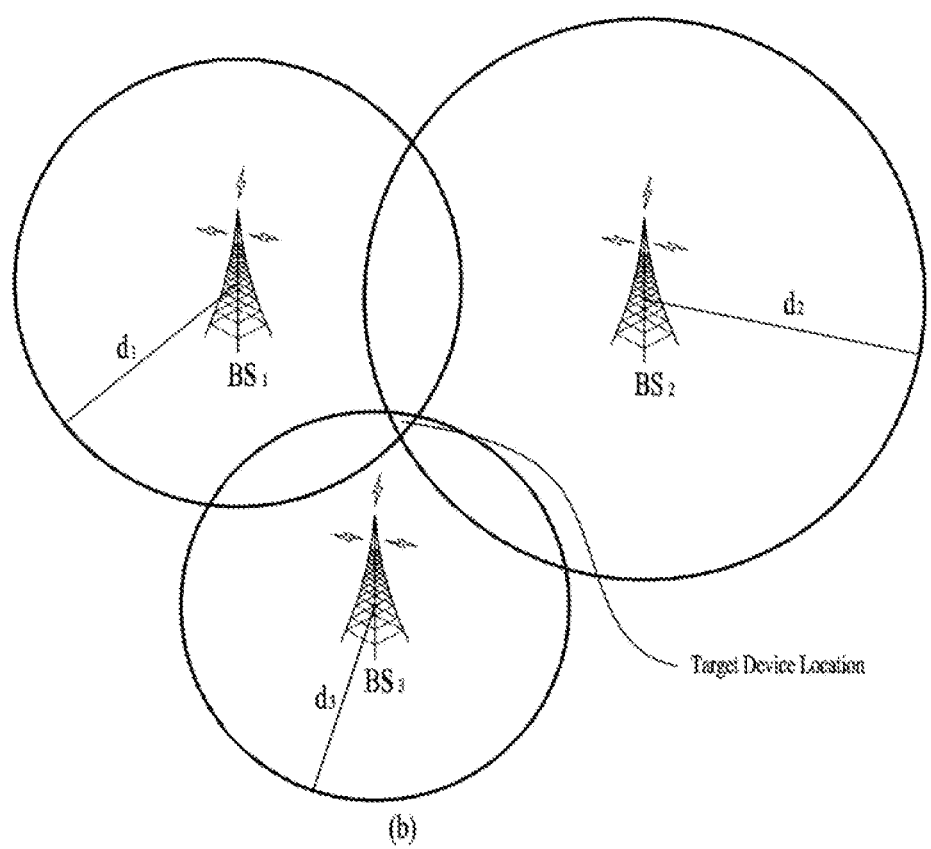

FIG. 20 is a diagram for explaining an exemplary multi-RTT positioning method.

Referring to an RTT process of FIG. 20(a), an initiating device and a responding device perform TOA measurement, and the responding device provides TOA measurements to the initiating device for RTT measurement (calculation). For example, the initiating device may be a TRP and/or a UE, and the responding device may be a UE and/or a TRP.

In operation 2001 according to an exemplary embodiment, the initiating device may transmit an RTT measurement request, and the responding device may receive the RTT measurement request.

In operation 2003 according to an exemplary embodiment, the initiating device may transmit an RTT measurement signal at time t0, and the responding device may obtain TOA measurement t1.

In operation 2005 according to an exemplary embodiment, the responding device may transmit an RTT measurement signal at time t2, and the initiating device may obtain TOA measurement t3.

In operation 2007 according to an exemplary embodiment, the responding device may transmit information about [t2−t1], and the initiating device may receive the corresponding information and calculate an RTT based on Equation 4 below. The corresponding information may be transmitted and received in a separate signal or in the RTT measurement signal of operation 2005.

$$RTT = t_3 - t_0 - [t_2 - t_1]$$ [Equation 4]

Referring to FIG. 20(b), an RTT may correspond to a double-range measurement between two devices. Positioning estimation may be performed from the corresponding information, and multilateration may be used for the positioning estimation. Radiuses d1, d2, and d3 may be determined based on the measured RTT, and the location of a target device may be determined to be the intersection of circles with radiuses d1, d2, and d3, which are centered on BS1, BS2, and BS3 (or TRPs), respectively.

<Uplink Power Control>

In wireless communication systems, it may be necessary to increase or decrease the transmission power of a UE and/or a mobile device depending on situations. Controlling the transmission power of the UE and/or mobile device may be referred to as UL power control. For example, transmission power control may be applied to satisfy requirements (e.g., signal-to-noise ratio (SNR), bit error ratio (BER), block error ratio (BLER), etc.) of a BS (e.g., gNB, eNB, etc.).

The above-described power control may be performed according to an open-loop power control method and a closed-loop power control method.

Specifically, the open-loop power control method refers to a method of controlling transmission power without feedback from a transmitting device (e.g., BS, etc.) to a receiving device (e.g., UE, etc.) and/or feedback from the receiving device to the transmitting device. For example, the UE may receive a specific channel/signal (pilot channel/signal) from the BS, and estimate the strength of received power based on the received channel/signal. Then, the UE may control the transmission power based on the strength of the estimated received power strength.

On the other hand, the closed-loop power control method refers to a method of controlling transmission power based on feedback from a transmitting device to a receiving device and/or feedback from the receiving device to the transmitting device. For example, the BS receives a specific channel/signal from the UE and determines an optimal power level of the UE based on a power level, SNR, BER, BLER, etc. which are measured based on the received specific channel/signal. The BS may transmit information (i.e., feedback) on the determined optimal power level to the UE on a control channel, and the UE may control the transmission power based on the feedback provided by the BS.

Hereinafter, power control methods for cases in which a UE and/or a mobile device perform UL transmission to a BS in a wireless communication system will be described in detail. Specifically, power control methods for transmission of: 1) a UL data channel (e.g., PUSCH); 2) a UL control channel (e.g., PUCCH); 3) a sounding reference signal (SRS); and 4) a random access channel (e.g., PRACH) will be described. In this case, a transmission occasion (i.e., transmission time unit) (i) for the PUSCH, PUCCH, SRS and/or PRACH may be defined by a slot index (n_s) in a frame with an SFN, a first symbol(S) in a slot, the number of consecutive symbols (L), and the like.

(1) Power Control of UL Data Channel

Regarding power control of a UL data channel, a power control method will be described based on a case in which the UE performs PUSCH transmission, for convenience of description. However, the power control method is not limited to the PUCSH transmission, that is, the power control method may be extended and applied to other UL data channels supported in wireless communication systems.

For PUSCH transmission in an active UL bandwidth part (BWP) of a carrier (f) of a serving cell (c), the UE may calculate a linear power value of transmission power determined by Equation 5 below. Thereafter, the corresponding UE may control the transmission power by taking the calculated linear power value into consideration for the number of antenna ports and/or the number of SRS ports.

In particular, if the UE performs PUSCH transmission in the active UL BWP (b) of the carrier (f) of the serving cell (c) using a parameter set configuration based on index j and a PUSCH power control adjustment state based on index l, the UE may determine PUSCH transmission power $P_{PUSCH,\,b,\,f,\,c}(i, j, q_d, l)$ (dBm) on a PUSCH transmission occasion (i) based on Equation 5 below.

[Equation 5]

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}\left(2^\mu \cdot M^{PUSCH}_{RB,b,f,c}(i)\right) + \alpha_{b,f,c}(j) \cdot PL_{b,f,c}(q_d) + \Delta_{TF,b,f,c}(i) + f_{b,f,c}(i, l) \end{array} \right\}$$

In Equation 5, index j denotes the index for an open-loop power control parameter (e.g., P_o, alpha (c), etc.), and a maximum of 32 parameter sets may be configured for each cell. Index q_d denotes the index of a DL RS resource for path loss (PL) measurement (e.g., $PL_{b,f,c}(q_d)$), and a maximum of four measurements may be configured for each cell. Index l denotes the index of a closed-loop power control process, and a maximum of two processes may be configured for each cell.

In addition, P_o (e.g., $P_{O\_PUSCH,\,b,f,c}(j)$) is a parameter broadcast as part of system information and may denote target received power of the receiver. The corresponding P_o value may be configured in consideration of UE throughput, cell capacity, noise and/or interference, etc. Alpha (e.g., $\alpha_{b,f,c}(j)$) may denote a rate for compensating for PL. Alpha may have a value from 0 to 1, and full pathloss compensation or fractional pathloss compensation may be performed according to the configured value. In this case, the alpha value may be configured in consideration of interference between UEs and/or data rates. In addition, $P_{CMAX,\,f,c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. $M_{RB,b,f,c}^{PUSCH}(i)$ may denote a PUSCH resource allocation bandwidth, which is expressed by the number of resource blocks (RBs) in the PUSCH transmission occasion based on an SCS (μ). $f_{b,f,c}(i, l)$, which is related to PUSCH power control adjustment states, may be configured or indicated based on a TPC command field of DCI received or detected by the UE (e.g., DCI format 0_0, DCI format 0_1, DCI format 2_2, DCI format2_3, etc.).

In this case, a specific radio resource control (RRC) parameter (e.g., SRI-PUSCHPowerControl-Mapping, etc.) may indicate a linkage relationship between an SRS resource indicator (SRI) field of the DCI and the aforementioned indices: j, q_d, and l. In other words, the above-mentioned indices j, l, and q_d may be associated with a beam, a panel, and/or a spatial domain transmission filter based on specific information. Therefore, PUSCH transmission power control may be performed in units of beams, panels, and/or spatial domain transmission filters.

The above-described parameters and/or information for PUSCH power control may be configured separately (independently) for each BWP. In this case, the corresponding parameters and/or information may be configured or indicated by higher layer signaling (RRC signaling, medium access control-control element (MAC-CE), etc.) and/or DCI. For example, the parameters and/or information for PUSCH power control may be provided by RRC signaling such as PUSCH-ConfigCommon, PUSCH-PowerControl, etc. The following shows PUSCH-ConfigCommon and PUSCH-PowerControl defined in 3GPP TS Rel.16 38.331.

```
PUSCH-ConfigCommon ::=                      SEQUENCE {
    groupHoppingEnabledTransformPrecoding        ENUMERATED {enabled}
OPTIONAL, -- Need R
    pusch-TimeDomain AllocationList         PUSCH-
TimeDomainResource AllocationList                                      OPTIONAL, --
Need R
    msg3-DeltaPreamble                      INTEGER (–1..6)
OPTIONAL, -- Need R                         INTEGER (–202..24)
    p0-NominalWithGrant
OPTIONAL, -- Need R
    ...
}
PUSCH-PowerControl ::=                      SEQUENCE {
    tpc-Accumulation                            ENUMERATED { disabled }
OPTIONAL, -- Need S
    msg3-Alpha                              Alpha
OPTIONAL, -- Need S
    p0-NominalWithoutGrant                  INTEGER (-202..24)
OPTIONAL, -- Need M
    p0-AlphaSets                            SEQUENCE (SIZE (1..maxNrofp0-PUSCH-
AlphaSets)) OF p0-PUSCH-AlphaSet            OPTIONAL, -- Need M
    pathlossReferenceRSToAddModList             SEQUENCE (SIZE (1..maxNrofPUSCH-
PathlossReferenceRSs)) OF PUSCH-PathlossReferenceRS
OPTIONAL, -- Need N
    pathlossReferenceRSToReleaseList        SEQUENCE (SIZE (1..maxNrofPUSCH-
PathlossReferenceRSs)) OF PUSCH-PathlossReferenceRS-Id
OPTIONAL, -- Need N
    twoPUSCH-PC-AdjustmentStates                ENUMERATED {twoStates}
OPTIONAL, -- Need S
    deltaMCS                                    ENUMERATED {enabled}
```

```
       OPTIONAL, -- Need S
          sri-PUSCH-Mapping ToAddModList          SEQUENCE (SIZE (1..maxNrofSRI-
       PUSCH-Mappings)) OF SRI-PUSCH-PowerControl
       OPTIONAL, -- Need N
          sri-PUSCH-Mapping ToReleaseList         SEQUENCE (SIZE (1..maxNrofSRI-
       PUSCH-Mappings)) OF SRI-PUSCH-PowerControlId
       OPTIONAL -- Need N
       }
```

The UE may determine or calculate the PUSCH transmission power according to the above-described method and transmit the PUSCH based on the determined or calculated PUSCH transmission power.

(2) Power Control of UL Control Channel

Regarding power control of a UL data channel, a power control method will be described based on a case in which the UE performs PUCCH transmission, for convenience of description. However, the power control method is not limited to the PUCCH transmission, that is, the power control method may be extended and applied to other UL data channels supported in wireless communication systems.

If the UE performs PUCCH transmission in an active UL BWP (b) of a carrier (f) of a primary cell (or secondary cell) (c) using a PUCCH power control adjustment state based on index 1, the UE may determine PUCCH transmission power $P_{PUCCH,b,f,c}$ (i, $q_u$, $q_d$, 1) (dBm) on a PUCCH transmission occasion (i) based on Equation 6 below.

occasion based on an SCS (#). Delta functions (e.g., $\Delta_{F\_PUCCH}(F)$, $\Delta_{TF,b,f,c}(i)$, etc.) may be configured in consideration of PUCCH formats (e.g., PUCCH formats 0, 1, 2, 3, 4, etc.). $g_{b,f,c}(i, 1)$, which is related to PUCCH power control adjustment states, may be configured or indicated based on a TPC command field of DCI received or detected by the UE (e.g., DCI format 1_0, DCI format 1_1, DCI format 2_2, etc.).

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage relationship between PUCCH resources and the aforementioned indices q_u, q_d, and 1. For example, the PUCCH spatial relation Activation/Deactivation command of the MAC-CE may activate or deactivate the linkage relationship

[Equation 6]

$$P_{PUCCH,b,f,c}(i, q_u, q_d, l) = \min\left\{ \begin{array}{l} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i, l) \end{array} \right\}$$

In Equation 6, q_u denotes the index of an open-loop power control parameter (e.g., P_o, etc.), and a maximum of 8 parameter values may be configured for each cell. Index q_d denotes the index of a DL RS resource for path-loss measurement (e.g., $PL_{b,f,c}(q_d)$), and a maximum of four measurements may be configured for each cell. Index 1 denotes the index of a closed-loop power control process, and a maximum of two processes may be configured for each cell.

In addition, P_o (e.g., $P_{O\_PUCCH, b,f,c}(q_u)$) is a parameter broadcast as part of system information and may denote target received power of the receiver. The corresponding P_o value may be configured in consideration of UE throughput, cell capacity, noise and/or interference, etc. In addition, $P_{CMAX,f,c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. $M_{RB,b,f,c}^{PUCCH}(i)$ may denote a PUCCH resource allocation bandwidth, which is expressed by the number of RBs in the PUCCH transmission between the PUCCH resources and the aforementioned indices q_u, q_d, and 1 based on the RRC parameter PUCCH-SpatialRelationInfo. In other words, the above-described indices q_u, q_d, and 1 may be associated with a beam, a panel, and/or a spatial domain transmission filter based on specific information. Therefore, PUCCH transmission power control may be performed in units of beams, panels, and/or spatial domain transmission filters.

The above-described parameters and/or information for PUCCH power control may be configured separately (independently) for each BWP. In this case, the corresponding parameters and/or information may be configured or indicated by higher layer signaling (RRC signaling, MAC-CE, etc.) and/or DCI. For example, the parameters and/or information for PUCCH power control may be provided by RRC signaling such as PUCCH-ConfigCommon, PUCCH-PowerControl, etc. The following shows PUCCH-ConfigCommon and PUCCH-PowerControl defined in 3GPP TS Rel.16 38.331.

```
PUCCH-ConfigCommon ::=              SEQUENCE {
    pucch-ResourceCommon            INTEGER (0..15)
    OPTIONAL, -- Cond InitialBWP-Only    ENUMERATED { neither, enable, disable },
    pucch-GroupHopping              INTEGER (0..1023)
    hoppingId
    OPTIONAL, -- Need R             INTEGER (-202..24)
    p0-nominal
```

-continued

```
OPTIONAL, -- Need R
  ...
}
PUCCH-PowerControl ::=        SEQUENCE {
  deltaF-PUCCH-f0                INTEGER (-16..15)
OPTIONAL, -- Need R
  deltaF-PUCCH-f1                INTEGER (-16..15)
OPTIONAL, -- Need R
  deltaF-PUCCH-f2                INTEGER (-16..15)
OPTIONAL, -- Need R
  deltaF-PUCCH-f3                INTEGER (-16..15)
OPTIONAL, -- Need R
  deltaF-PUCCH-f4                INTEGER (-16..15)
OPTIONAL, -- Need R
  p0-Set                         SEQUENCE (SIZE (1..maxNrofPUCCH-P0-
PerSet)) OF P0-PUCCH             OPTIONAL, -- Need M
  pathlossReferenceRSs           SEQUENCE (SIZE (1..maxNrofPUCCH-
PathlossReferenceRSs)) OF PUCCH-PathlossReferenceRS
OPTIONAL, -- Need M
  twoPUCCH-PC-AdjustmentStates   ENUMERATED {twoStates}
OPTIONAL, -- Need S
  ...,
}
P0-PUCCH ::=                  SEQUENCE {
  p0-PUCCH-Id                    P0-PUCCH-Id,
  p0-PUCCH-Value                 INTEGER (-16..15)
}
P0-PUCCH-Id ::=               INTEGER (1..8)
PUCCH-PathlossReferenceRS ::=    SEQUENCE {
  pucch-PathlossReferenceRS-Id   PUCCH-PathlossReferenceRS-Id,
  referenceSignal                CHOICE {
    ssb-Index                      SSB-Index,
    csi-RS-Index                   NZP-CSI-RS-ResourceId
  }
}
```

The UE may determine or calculate the PUSCH transmission power according to the above-described method and transmit the PUCCH based on the determined or calculated PUCCH transmission power.

(3) Power Control of SRS

In relation to SRS transmission in an active UL BWP of a carrier (f) of a serving cell (c), the UE may calculate a linear power value of transmission power determined by Equation 7 below. Thereafter, the UE may control the transmission power by equally dividing the calculated linear power value over antenna port(s) configured for the SRS.

Specifically, when the UE performs SRS transmission in an active UL BWP (b) of the carrier (f) of the serving cell (c) using an SRS power control adjustment state based on index l, the UE may determine SRS transmission power $P_{SRS,b,f,c}(i,q,l)$ (dBm) on an SRS transmission occasion (i) based on Equation 7 below.

In addition, P_o (e.g., $P_{O\_SRS,b,f,c}(q_s)$) is a parameter broadcast as part of system information and may denote target received power of the receiver. The corresponding P_o value may be configured in consideration of UE throughput, cell capacity, noise and/or interference, etc. Alpha (e.g., $\alpha_{SRS,b,f,c}(q_s)$) may denote a rate for compensating for PL. Alpha may have a value from 0 to 1, and full pathloss compensation or fractional pathloss compensation may be performed according to the configured value. In this case, the alpha value may be configured in consideration of interference between UEs and/or data rates. In addition, $P_{CMAX,f,c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. $M_{SRS,b,f,c}(i)$ may denote an SRS resource allocation bandwidth, which is expressed by the

[Equation 7]
$$P_{SRS,b,f,c}(i,q,l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i,l) \end{array} \right\}$$

In Equation 7, q_s denotes the index of an open-loop power control parameter (e.g., P_o, alpha ($\alpha$), a DL RS resource for path-loss measurement $PL_{b,f,c}(q_d)$, etc.), which may be configured for SRS resource set. Index l denotes an index for a closed-loop power control process, and the corresponding index may be configured independently of a PUSCH or configured in relation to the PUSCH. If SRS power control is not related to the PUSCH, the maximum number of closed-loop power control processes for the SRS may be 1.

number of RBs in the SRS transmission occasion based on an SCS ($\mu$). $h_{b,f,c}(i,l)$, which is related to SRS power control adjustment states, may be configured or indicated based on a TPC command field of DCI received or detected by the UE (e.g., DCI format 2_3, etc.) and/or an RRC parameter (e.g., srs-PowerControlAdjustmentStates, etc.).

A resource for SRS transmission may be applied as a reference for the BS and/or UE to determine a beam, a panel, and/or a spatial domain transmission filter. Thus, SRS transmission power control may be performed in units of beams, panels, and/or spatial domain transmission filters.

The above-described parameters and/or information for SRS power control may be configured separately (independently) for each BWP. In this case, the corresponding parameters and/or information may be configured or indicated by higher layer signaling (RRC signaling, MAC-CE, etc.) and/or DCI. For example, the parameters and/or information for SRS power control may be provided by RRC signaling such as SRS-Config, SRS-TPC-CommandConfig, etc. The following shows SRS-Config and SRS-TPC-CommandConfig defined in 3GPP TS Rel. 16 38.331.

```
SRS-Config ::=                                    SEQUENCE {
    srs-ResourceSetToReleaseList                      SEQUENCE (SIZE(1..maxNrofSRS-
ResourceSets)) OF SRS-ResourceSetId                       OPTIONAL, -- Need N
    srs-ResourceSetToAddModList                       SEQUENCE (SIZE(1..maxNrofSRS-
ResourceSets)) OF SRS-ResourceSet                         OPTIONAL, -- Need N
    srs-Resource ToReleaseList                        SEQUENCE (SIZE(1..maxNrofSRS-
Resources)) OF SRS-ResourceId                             OPTIONAL, -- Need N
    srs-Resource ToAddModList                         SEQUENCE (SIZE(1..max.NrofSRS-
Resources)) OF SRS-Resource                               OPTIONAL, -- Need N
    tpc-Accumulation                                  ENUMERATED {disabled}
OPTIONAL, -- Need S
    ...,
SRS-ResourceSet ::=                               SEQUENCE {
    srs-ResourceSetId                                     SRS-ResourceSetId,
    srs-ResourceIdList                                SEQUENCE (SIZE(1..maxNrofSRS-
ResourcesPerSet)) OF SRS-ResourceId               OPTIONAL, -- Cond Setup
    resource Type                                     CHOICE {
        aperiodic                                         SEQUENCE {
            aperiodicSRS-ResourceTrigger                      INTEGER (1..maxNrofSRS-
TriggerStates-1),
            csi-RS                                            NZP-CSI-RS-ResourceId
OPTIONAL, -- Cond NonCodebook
            slotOffset                                        INTEGER (1..32)
OPTIONAL, -- Need S
            ...,
            [[
            aperiodicSRS-ResourceTriggerList                                   SEQUENCE
(SIZE(1..maxNrofSRS-TriggerStates-2))                                          OF INTEGER
(1..maxNrofSRS-TriggerStates-1)      OPTIONAL -- Need M
            ]]
        },
        semi-persistent                                   SEQUENCE {
            associatedCSI-RS                                  NZP-CSI-RS-ResourceId
OPTIONAL, -- Cond NonCodebook
            ...
        },
        periodic                                          SEQUENCE {
            associatedCSI-RS                                  NZP-CSI-RS-ResourceId
OPTIONAL, -- Cond NonCodebook
            ...
        }
    },
    usage                                             ENUMERATED {beam.Management,
codebook, nonCodebook, antennaSwitching},
    alpha                                             Alpha
OPTIONAL. -- Need S
    p0                                                INTEGER (-202...24)
OPTIONAL, -- Cond Setup
    pathlossReferenceRS                               PathlossReferenceRS-Config
OPTIONAL, -- Need M
    srs-PowerControlAdjustmentStates                  ENUMERATED { sameAsFci2,
separateClosedLoop}                               OPTIONAL, -- Need S
    ...,
    [[
    pathlossReferenceRSList-r16                       SetupRelease { PathlossReferenceRSList-
r16}                  OPTIONAL -- Need M
    ]]
}
PathlossReferenceRS-Config ::=                    CHOICE {
    ssb-Index                                         SSB-Index,
    csi-RS-Index                                      NZP-CSI-RS-ResourceId
}
SRS-PosResourceSet-r16 ::=                        SEQUENCE {
    srs-PosResourceSetId-r16                              SRS-PosResourceSetId-r16,
    srs-PosResourceIdList-r16                         SEQUENCE (SIZE(1..max.NrofSRS-
ResourcesPerSet)) OF SRS-PosResourceId-r16
OPTIONAL, -- Cond Setup
    resource Type-r16                                 CHOICE {
        aperiodic-r16                                     SEQUENCE {
            aperiodicSRS-ResourceTriggerList-r16                               SEQUENCE
(SIZE(1..maxNrofSRS-TriggerStates-1))
                                                                                OF INTEGER
```

```
(1..maxNrofSRS-TriggerStates-1)         OPTIONAL, -- Need M
    ...
    },
        semi-persistent-r16                 SEQUENCE {
            ...
        },
        periodic-r16                        SEQUENCE {
            ...
        }
    },
    alpha-r16                               Alpha
OPTIONAL, -- Need S                         INTEGER (-202..24)
    p0-r16
OPTIONAL, -- Cond Setup
    pathlossReferenceRS-Pos-r16             CHOICE {
        ssb-IndexServing-r16                    SSB-Index,
        ssb-Ncell-r16                           SSB-InfoNcell-r16,
        dl-PRS-r16                              DL-PRS-Info-r16
    }
OPTIONAL - Need M
    ...
}
SRS-TPC-CommandConfig ::=                   SEQUENCE {
    startingBitOfFormat2-3                  INTEGER (1..31)
OPTIONAL, -- Need R                         INTEGER (0..1)
    fieldTypeFormat2-3
OPTIONAL, -- Need R
    ...,
    [[
startingBitOfFormat2-3SUL                   INTEGER (1.31)
OPTIONAL -- Need R
    ]]
}
```

The UE may determine or calculate the SRS transmission power according to the above-described method and transmit the SRS based on the determined or calculated SRS transmission power.

(4) Power Control of Random Access Channel

When the UE performs PRACH transmission in an active UL BWP (b) of a carrier (f) of a serving cell (c), the UE may determine PRACH transmission power $P_{PRACH,b,f,c}(i)$ (dBm) on a PRACH transmission occasion (i) based on Equation 8 below.

$$P_{PRACH,b,f,c}(i) = \min\{P_{CMAX,f,c}(i), P_{PRACHtarget,f,c} + PL_{b,f,c}\} \quad \text{[Equation 8]}$$

In Equation 8, $P_{CMAX, f,c}(i)$ may denote configured UE transmission (or transmit) power. For example, the configured UE transmission (or transmit) power may be interpreted as 'configured maximum UE output power' defined in 3GPP TS 38.101-1 and/or TS 38.101-2. In addition, $P_{PRACH, target, f,c}$ denotes PRACH target reception power provided through higher layer signaling (e.g., RRC signaling, MAC-CE, etc.) for the active UL BWP. $PL_{b,f,c}$ denotes PL for the active UL BWP, which may be determined based on a DL RS related to PRACH transmission in the active DL BWP of the serving cell (c). For example, the UE may determine PL related to PRACH transmission based on an SS/PBCH block related to the PRACH transmission.

The above-described parameters and/or information for PRACH power control may be configured separately (independently) for each BWP. In this case, the corresponding parameters and/or information may be configured or indicated by higher layer signaling (RRC signaling, MAC-CE, etc.) and/or DCI. For example, the parameters and/or information for PRACH power control may be provided by RRC signaling such as RACH-ConfigGeneric, etc. The following shows RACH-ConfigGeneric defined in 3GPP TS Rel.16 38.331.

```
RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig   INTEGER(0..15),
    preambleReceivedTargetPower     INTEGER (-202..-60),
    preamble Trans.Max              ENUMERATED {n3, n4, nj, n6, n7, n8, n10, n20, n50,
n100, n200},
    powerRamping Step               ENUMERATED {dB0, dB2, dB4, dB6},
    ra-Response Window              ENUMERATED {sl1, sl2, sl4, sl8, sl10, sl20, sl40,
sl80),
    ...
}
```

The UE may determine or calculate the PRACH transmission power according to the above-described method and transmit the PRACH based on the determined or calculated PRACH transmission power.

(5) Priorities for Transmission Power Control

Hereinafter, a method of controlling the transmission power of a UE will be described in consideration of single cell operation in a carrier aggregation environment or single cell operation in multi-UL carrier (e.g., two carriers) environment.

In this case, if the total UE transmission (or transmit) power of UL transmissions (e.g., PUSCH, PUCCH, SRS, and PRACH transmissions described above in (1) to (4)) on transmission occasions (i) exceeds the linear value of configured UE transmission (or transmit) power (e.g., $\hat{P}_{CMAX}$(i)), the UE may be configured to allocate UL transmission power according to priorities (priority order). For example, the configured UE transmission (or transmit) power may mean 'configured maximum UE output power' (e.g., $P_{CMAX}$(i)) defined in 3GPP TS 38.101-1 and/or TS 38.101-2.

In this case, the priorities for transmission power control may be configured or defined in the following order.

PRACH transmission on PCell

PUCCH for hybrid automatic repeat and request-acknowledgement (HARQ-ACK) information and/or scheduling request (SR) or PUSCH for HARQ-ACK information PUCCH or PUSCH for channel state information (CSI)

PUSCH for neither HARQ-ACK information nor CSI

SRS transmission or PRACH transmission in serving cell other than PCell (however, an aperiodic SRS has a higher priority than a semi-persistent SRS and/or periodic SRS)

The UE may control the total transmission power to be less than or equal to the linear value of the configured UE transmission (or transmit) power in each symbol of the transmission occasion (i) based on the power allocation according to the priority order as described above. For example, to this end, the UE may be configured to scale and/or drop the power of UL transmission with a low priority. In this case, details of scaling and/or dropping may be configured or defined according to UE implementation.

As a particular example, for transmissions with the same priority in carrier aggregation, the UE may assume that transmission in a Pcell has a higher priority than transmission in a secondary cell (Scell). Additionally/alternatively, for transmissions with the same priority in multiple UL carriers (e.g., two UL carriers), the UE may assume a carrier on which PUCCH transmission is configured to have a high priority. In addition, if PUCCH transmission is not configured on any carriers, the UE may assume that transmission on a non-supplementary UL carrier has a high priority.

(6) Transmission Power Control Procedure

Figure 21:
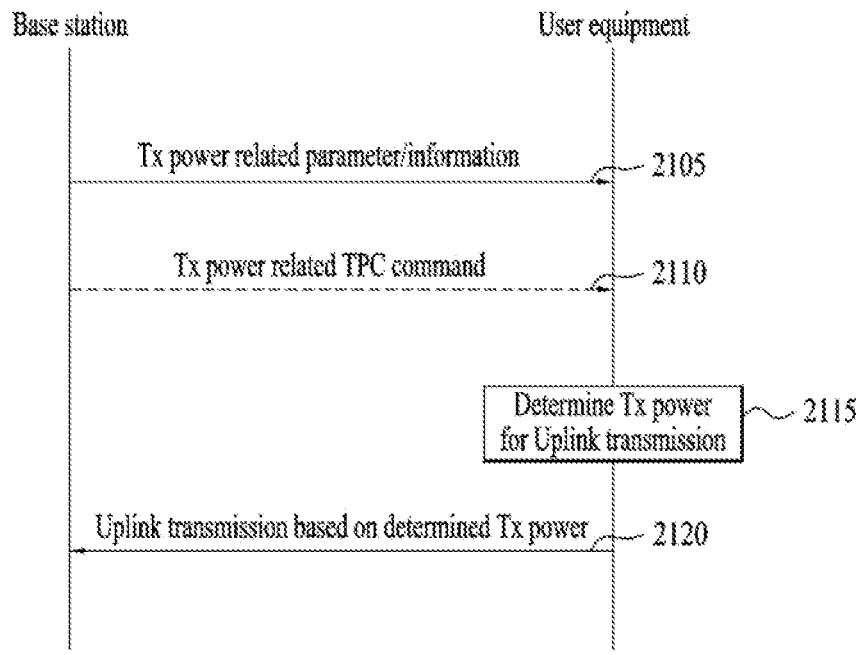
FIG. 21 is a diagram for explaining an embodiment of a procedure for controlling uplink transmission power.

FIG. 21 is a diagram for explaining an exemplary procedure for controlling UL transmission power.

First, a UE may receive parameters and/or information related to transmission power (Tx power) from a BS (2105). In this case, the UE may receive the corresponding parameters and/or information through higher layer signaling (e.g., RRC signaling, MAC-CE, etc.). For example, for PUSCH transmission, PUCCH transmission, SRS transmission, and/or PRACH transmission, the UE may receive the above-described parameters and/or information related to transmission power control.

Thereafter, the UE may receive a TPC command related to transmission power from the BS (2110). In this case, the UE may receive the corresponding TPC command through lower layer signaling (e.g., DCI). For example, for PUSCH transmission, PUCCH transmission, and/or SRS transmission, the UE may receive information on a TPC command to be used for determining a power control adjustment state, etc. in a TPC command field of a predefined DCI format as described above. However, the corresponding step may be omitted in PRACH transmission.

Thereafter, the UE may determine (or calculate) transmission power for UL transmission based on the parameters, information, and/or TPC command received from the BS (2115). For example, the UE may determine PUSCH transmission power, PUCCH transmission power, SRS transmission power, and/or PRACH transmission power according to the above-described methods (e.g., Equation 5, Equation 6, Equation 7, Equation 8, etc.). Additionally/alternatively, when two or more UL channels and/or signals need to be transmitted together as in carrier aggregation, the UE may determine the transmission power for UL transmission in consideration of the above-described priorities.

Thereafter, the UE may perform transmission of one or more UL channels and/or signals (e.g., PUSCH, PUCCH, SRS, PRACH, etc.) to the BS based on the determined (or calculated) transmission power (2120).

Before describing the present disclosure in detail, the implementation of exemplary operations of a UE and a network node will be described with reference to FIGS. 22 and 23 according to embodiments of the present disclosure.

Figure 22:
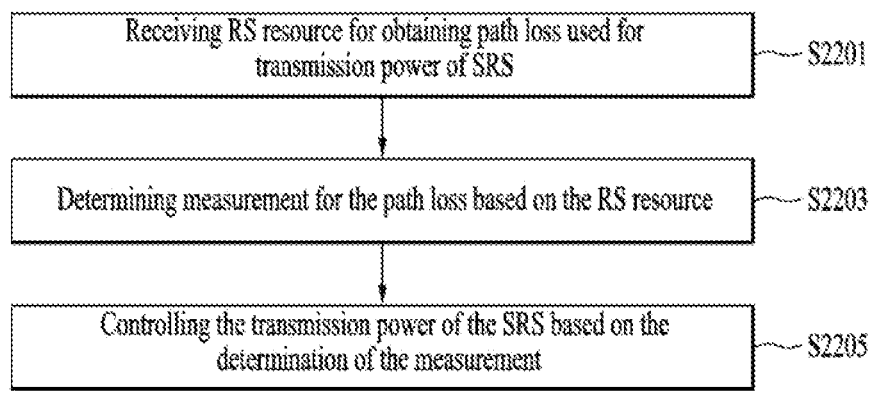
FIGS. 22 and 23 are diagrams for explaining the implementation of exemplary operations of a UE and a network node according to embodiments of the present disclosure.

FIG. 22 is a diagram for explaining the implementation of exemplary operations of a UE according to the present disclosure. Referring to FIG. 22, the UE may receive an RS resource for obtaining PL used for transmission power of an SRS (S2201). Thereafter, the UE may determine measurement of the PL based on the RS resource (S2203). The UE may control the transmission power of the SRS based on the determination of the measurement (S2205). In this case, specific methods by which the UE transmits the SRS after or in S2201 to S2205 may be based on the following embodiments and features thereof.

Meanwhile, the UE of FIG. 22 may be any one of the various wireless devices illustrated in FIGS. 1 to 4. For example, the UE of FIG. 22 may be the first wireless device 100 of FIG. 1 or the wireless device 100 or 200 of FIG. 2. In other words, the operation process of FIG. 22 may be performed and executed by any one of the various wireless devices illustrated in FIGS. 1 to 4.

Figure 23:
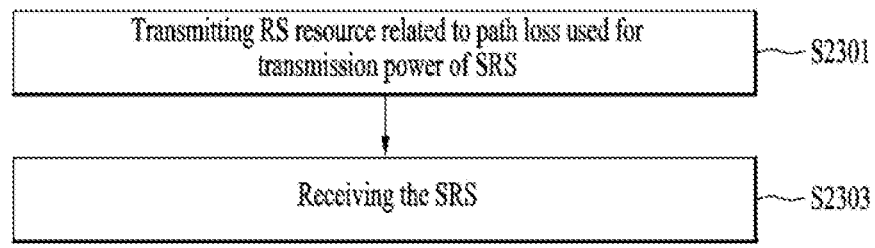

FIG. 23 is a diagram for explaining the implementation of exemplary operations of a network node according to the present disclosure. Referring to FIG. 23, the network node may transmit an RS resource related to PL used for transmission power of an SRS (S2301). Thereafter, the network node may receive the SRS (S2303). In this case, specific methods by which the network node receives the SRS after or in S2301 and S2303 may be based on the following embodiments and features thereof.

Meanwhile, the network node of FIG. 23 may be any one of the various wireless devices illustrated in FIGS. 1 to 4. For example, the network node of FIG. 23 may be the second wireless device 200 of FIG. 1 or the wireless device 100 or 200 of FIG. 2. In other words, the operation process of FIG. 23 may be performed and executed by any one of the various wireless devices illustrated in FIGS. 1 to 4.

Hereinafter, a description will be given of how the UE determines the SRS transmission power when the UE fails to obtain path-loss reference based on the RS resource in the steps (S2201 to S2203, and S2301) of receiving the RS resource for obtaining the PL used for the SRS transmission power and determining the measurement of the PL based on the RS resource.

In the recent NR standardization discussion, it was agreed to introduce SRS power control functions in consideration of not only the serving cell of the UE but also other cells or neighboring cells. In particular, for UL SRS transmission power related to positioning, the discussion covers following: 1) supporting configuration regarding a DL RS of a neighboring cell to be used as DL path-loss reference for SRS power control such as a CSI-RS, an SSB, and/or a DL PRS; 2) a method and procedure for signaling the configuration regarding the DL RS of the neighboring cell; 3) a fallback procedure in case that a UE fails to obtain the path-loss reference; and 4) configuration regarding the number of times of path-loss measurement.

The above discussion is for UE positioning. That is, the discussion is intended to effectively support UTDOA or multi-cell RTT using both UL/DL based on SRS power control. Unlike general data transmission/reception, UTDOA or multi-cell RTT requires that a specific UE transmits a UL RS such as an SRS by targeting other cells or neighboring cells as well as the serving cell of the UE.

However, even if the BS or location server instructs or configures the UE to use a DL RS, which is transmitted on one or more CSI-RS resources, one or more SSBs, or one or more PRS resources from a specific neighboring cell or another cell, as a path-loss reference signal, the UE may not correctly receive the RS resource transmitted from the specific neighboring cell or the other cell. For example, if the serving cell transmits data and/or RSs in a time/frequency resource region where it is expected that a specific cell transmit a specific RS, the UE may not receive the specific RS. Alternatively, if the received strength (e.g., RSRP) or signal to noise power ratio/signal to interference plus noise power ratio (SNR/SINR) of the specific RS transmitted from the specific cell is too low, the UE fail to detect the specific RS.

In the above case, since the UE fails to receive the specific DL RS from the specific cell, the UE may not use the specific DL RS as the path-loss reference signal. As a result, the UE may have problems in calculating UE transmission (or transmit) power. Accordingly, there may be a need for methods of operating a UE, a BS, and/or a location server to compensate for these problems. In the present disclosure, there are provided methods of operating a UE when the UE does not properly receive a specific downlink RS transmitted from a neighboring cell or another cell and thus fails to acquire path-loss reference in determining SRS transmission power in consideration of its serving cell as well as the neighboring cell or the other cell for SRS transmission. In this document, a cell may be used as the concept of a BS, a TP, and/or a TRP.

Operation Method #1

When the UE does not properly receive a DL RS resource transmitted from a specific neighboring cell or another cell indicated to the UE, or when the UE fails to detect the DL RS resource for a group of cells/gNBs/TPs indicated to the UE, the UE may operate as follows.

(1) Non-Transmission of SRS

First, the UE may not transmit an SRS resource that the UE is supposed to transmit. That is, the UE may not transmit the SRS resource, which the BS or location server instructs the UE to transmit by targeting the specific neighboring cell or the other cell. In addition, the UE may not transmit the SRS resource and reports to the BS or location server that the UE does not properly receive the DL RS resource transmitted from the specific neighboring cell or the other cell indicated to the UE. Alternatively, the UE may report to the BS or location server that the UE does not obtain measurement results for the DL RS transmitted from the specific neighboring cell or the other cell indicated to the UE.

In this case, the operation in which the UE does not transmit the SRS and/or the operation in which the UE performs reporting thereof may be instructed or configured in advance by the BS or location server.

Considering that when the UE fails to receive the DL RS resource transmitted from the specific neighboring cell or the other cell, the amount of power required when the UE transmits the SRS resource is much lower than the amount of power required when the BS/TP/location server transmits the DL RS resource, the above-described UE operations may be meaningful in terms of preventing power wastage. That is, when the UE fails to receive the DL RS resource transmitted from the specific neighboring cell or the other cell, even if the UE transmits the SRS resource, it is expected that a target cell/gNB/TP, which needs to receive the SRS resource, will not properly receive the SRS resource. In such a situation, if the UE does not transmit the SRS, instead of interfering with other cells by transmitting the SRS resource, it may be helpful in terms of overall performance of the wireless network.

(2) Use of Average PL Value

As an example in which the UE intends to transmit the SRS resource, the UE may use DL RS resources where the UE is capable of obtaining measurement results among DL RS resources transmitted from neighboring cells or other cells except for the serving cell in order to calculate the average value of PL compensation values of the corresponding DL RS resources. Then, the UE may use the average value as a path-loss reference value for the following DL RS resources: a DL RS resource for which the UE fails to obtain a measurement result even though the DL RS resource is a measurement target; or a DL RS resource that the UE fails to receive even though the DL RS resource is indicated for PL calculation.

(3) Use of Maximum Available Power

As another example in which the UE intends to transmit the SRS resource, the UE may transmit the corresponding SRS resource with the maximum power that the UE is capable of allocating, instead of configuring the SRS transmission power based on PL calculation.

In this case, the operation in which the UE performs SRS transmission with the maximum available power may be instructed or configured in advance by the BS or location server. Considering the hearability of the specific neighboring cell or the other cell for the SRS resource, it may be suitable that the UE uses the maximum transmission power to transmit the SRS because the SRS resource transmitted by the UE is targeted to the specific neighboring cell or the other cell.

(4) Use of Power Configuration of Serving Cell

As another example in which the UE intends to transmit the SRS resource, the UE may transmit the corresponding SRS resource with SRS transmission power indicated or configured by the current serving cell of the UE. That is, the UE may configure the transmission power of the SRS resource to be transmitted to the specific neighboring cell or the other cell based on a power control configuration used when the UE transmits an SRS resource to the serving cell.

For example, the UE may receive an SSB to obtain an MIB for the serving cell. In this case, if the UE determines that the UE may not accurately measure a PL value for SRS power control during SRS transmission, the UE may calculate the PL value for SRS power control based on a reference resource obtained from the SSB of the serving cell, which is for reception of the MIB.

$$P_{SRS,b,f,c}(i, q, l) =$$

$$\min\left\{\begin{array}{l}P_{CMAX,f,c}(i),\\ P_{O\_SRS,b,f,c}(q_u) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l)\end{array}\right\}$$

Specifically, the SRS transmission power is determined according to the above equation. Among the factors of the equation, a factor $PL_{b,f,c}(q_d)$ that represents path-loss measurement values may be calculated based on the reference resource obtained from the SSB of the serving cell for receiving the MIB.

In addition, the operation in which the UE performs SRS transmission to the specific neighboring cell or the other cell based on the power configuration of the serving cell may be instructed or configured in advance by the BS or location server.

(5) Use of Power Offset

As another example in which the UE intends to transmit the SRS resource, the UE may apply a specific power offset to the transmission power used when transmitting the SRS resource to the serving cell and transmit the SRS resource to the specific neighboring cell or the other cell with transmission power increased by the specific offset. Here, the specific offset may be configured by the BS to the UE through signaling at various layers such as RRC signaling, MAC-CE signaling, or DCI signaling. Alternatively, the UE may be configured to autonomously determine and apply the specific offset and report the offset used by the UE to the BS.

In this case, the offset value used for determining the transmission power may be a relative ratio of the amount of power that may be used when the SRS resource is transmitted to the specific neighboring cell or the other cell to the amount of power used when the SRS resource is transmitted to the serving cell. Additionally/alternatively, the offset value may be an absolute value representing the difference between the amount of power that may be used when the SRS resource is transmitted to the specific neighboring cell or the other cell to the amount of power used when the SRS resource is transmitted to the serving cell. In addition, the offset value used for determining the transmission power is not limited to a positive (+) value as in the above example. That is, the offset value may have a negative (−) value so that the transmission power used when the SRS resource is transmitted to the specific neighboring cell or the other cell may be lower than the transmission power used when the SRS resource is transmitted to the serving cell by the offset value.

(6) Direct Indication of Transmission Power

As a further example in which the UE intends to transmit the SRS resource, the UE may request the BS to directly indicate or configure the transmission power of the SRS resource to be transmitted to the specific neighboring cell or the other cell. Upon receiving the request from the UE, the BS may indicate to the UE the offset applicable to the transmission power used when the SRS resource is transmitted to the serving cell or the absolute value of the transmission power used when the SRS resource is transmitted to the specific neighboring cell or the other cell.

The above-described operation examples may be organized in relation to the contents of the NR standardization discussion. In the previous NR standardization discussion, support of SRS transmission power control in consideration of neighboring cells has been discussed, but it has not been discussed which DL RS may be used as path-loss reference for SRS transmission power control. In consideration of detection possibility for many neighboring cells, a DL PRS may be considered as the path-loss reference for SRS power control. In addition, it may be necessary to discuss a fallback procedure for a case in which the UE fails to acquire the path-loss reference for neighboring cells.

In particular, when the UE fails to acquire path-loss reference for a neighboring cell corresponding to the transmission target, the UE may perform the following operations as fallback mode for SRS power control, and this may be applied similarly to the above-described operation examples of Embodiment 1.

Specifically, the UE may transmit no SRS resource to the neighboring cell corresponding to the transmission target and inform the network that the UE is incapable of performing normal SRS resource transmission to the corresponding neighboring cell. Alternatively, the UE may transmit an SRS resource by allocating the maximum transmission power available for the corresponding neighboring cell. Alternatively, the UE may transmit the SRS resource to the corresponding neighboring cell with transmission power available for the serving cell. Alternatively, the UE may be provided with a power configuration available for the corresponding neighboring cell from the serving cell and transmit the SRS resource to the neighboring cell with transmission power allocated by the indicated power configuration. In this case, the indicated power configuration may be a power offset additionally applicable to the transmission power available for the serving cell.

Regarding prevention of power wastage when the UE is incapable of receiving an RS resource from a neighboring cell, even if the UE transmits an SRS resource with the maximum available power, the maximum power may be much lower than BS transmission power of the neighboring cell, and thus, it may be difficult for the BS/TP to detect the SRS resource transmitted by the UE with the maximum power. Therefore, in such a case, it may be most appropriate for the UE not to transmit the SRS resource to the target neighboring cell in order to prevent power wastage in the above-described operation examples.

Operation Method #2

The UE may be indicated or configured with a DL RS resource transmitted from a specific neighboring cell or another cell rather than the serving cell as a quasi-co-location (QCL) resource of QCL type D for other DL RS resources. In addition, the UE may be indicated or configured with the DL RS resource transmitted from the specific neighboring cell or the other cell rather than the serving cell as a resource of spatial relation information for a specific UL SRS resource. Thus, the UE may perform measurement for the DL RS resource transmitted from the specific neighboring cell or the other cell. Then, the UE may receive another DL RS resource or transmit a UL SRS resource in a direction in which the DL RS resource is received.

However, even if the UE receives the DL RS resource or transmits the SRS resource in the above manner, the UE may not properly obtain measurement results for the DL RS resource transmitted from the specific neighboring cell or the other cell for the following reasons: interference from other resources and/or undetectable errors due to extremely low signal strength.

In this case, the UE may report to the BS that although the UE is indicated or configured with the DL RS resource corresponding to the measurement target, which is transmitted from the specific neighboring cell or the other cell, as the QCL type D resource, the UE does not know exactly the direction in which the DL RS resource is received. Alternatively, the UE may report to the BS feedback such as that the measurement quality of the DL RS resource corresponding to the measurement target is too low.

In addition, when the UE is indicated or configured with the DL RS resource corresponding to the measurement target, which is transmitted from the specific neighboring cell or the other cell, as the QCL type D resource for a specific DL RS resource, the BS may indicate or configure to the UE a fallback QCL resource used by the UE when the UE fails to properly obtain the measurement result for the DL RS resource corresponding to the measurement target due to the above-mentioned reasons. In this case, the fallback QCL resource may have the same QCL type as the initial QCL resource, i.e., QCL type D. However, the present disclosure is not limited thereto, that is, the fallback QCL resource may have other types. When the UE determines that the UE fails to obtain the measurement result for the measurement target DL RS resource, the UE may request the BS to indicate or configure the fallback QCL resource.

Similarly, the UE may report to the BS that although the UE is configured or indicated with the DL RS resource transmitted from the specific neighboring cell or the other cell as the resource of spatial relation information for the specific UL SRS resource, the UE does not know exactly the direction in which the DL RS resource is received. Alternatively, the UE may report to the BS feedback such as that the measurement quality of the DL RS resource is too low.

In addition, when the UE is indicated or configured with the DL RS resource transmitted from the specific neighboring cell or the other cell as the resource of spatial relation information for the specific UL SRS resource, the BS may indicate or configure to the UE alternative spatial relation information that may be used when the UE fails to properly obtain the measurement result for the DL RS resource due to the above-mentioned reasons. Here, the alternative spatial relation information means a resource of spatial relation information that may be used as a fallback RS resource. When the UE determines that the UE fails to obtain the measurement result for the DL RS resource, the UE may request the BS to indicate or configure the alternative spatial relation information and fallback.

Operation Method #3

The UE may be indicated or configured with not only a DL RS resource transmitted from the serving cell but also a DL RS resources transmitted from a specific neighboring cell/TP or another cell/TP as a QCL resource of QCL type D for other DL RS resources.

In addition, the UE may be configured or indicated with not only a DL RS resource transmitted from the serving cell and/or a UL SRS resource to be used for SRS transmission but also a DL RS resource transmitted from the specific neighboring cell/TP or another cell/TP and/or a UL SRS resource to be used for SRS transmission as a resource of spatial relation information for a specific UL SRS resource. Here, the specific UL SRS resource which is indicated to the UE as the source of the spatial relation information may be an SRS resource or an SRS resource set configured for UE positioning.

In this case, when the UE is configured or indicated with the QCL resource of QCL type D for DL RS resources and the UL SRS resource that is the source of the spatial relation information as described above, the UE may be configured with information on the related cell and/or TP together with information on the RS resource. In addition, the QCL resource of QCL type D for DL RS resources and the UL SRS resource that is the source of the spatial relation information may be configured by the location server or BS.

Based on the configuration of the QCL resource of QCL type D for DL RS resources, the UE may perform measurement for the DL RS resource transmitted from the neighboring cell or the other cell. The UE may receive another DL RS resource in the direction in which the corresponding DL RS resource is received or transmit a UL SRS resource in the corresponding direction. However, in this case, the UE may not obtain the measurement result for the DL RS resource transmitted from the specific neighboring cell or the other cell other than the serving cell, that is, a PRS resource, an SSB and/or a CSI-RS resource for radio resource management (RRM), for the following reasons: interference from other resources and/or undetectable errors due to extremely low signal strength.

The UE may be configured or indicated by the wireless network BS and/or location server/LMF with a DL RS resource (i.e., a PRS resource, an SSB and/or a CSI-RS resource) transmitted from a specific neighboring cell or another cell other than the serving cell as a resource of spatial relation information for a specific UL SRS resource. Here, the specific UL SRS resource, which is the source of the spatial relation information, may be dedicated to the UE for UE positioning. In such a case, if it is determined that the UE fails to obtain the measurement result for the DL RS resource transmitted from the specific neighboring cell or the other cell other than the serving cell or fails to receive the DL RS resource, the UE may consider performing the following operations.

1) The UE may report to the BS or location server that the UE does not properly receive the PRS resource, SSB and/or CSI-RS resource, which are the resource of the spatial relation information configured or indicated by the BS or location server, or the UE may report to the BS or location server that the UE does not properly detect the corresponding resources. The UE may not transmit the SRS resource or may transmit the SRS resource as a zero-power SRS resource. In this case, (a) the operation in which the UE reports to the BS or location server that the UE does not properly receive the resource of the spatial relation information; and (b) the operation in which the UE does not transmit the SRS resource or transmits the zero-power SRS resource may be performed simultaneously or sequentially.

2) The UE may request the BS or location server to provide an angle offset. Here, the angle offset is an angle that may indicate a certain direction such as a clockwise or counter clockwise direction with respect to a specific transmission and/or reception beam of the UE. The angle offset may be indicated or configured to the UE. Alternatively, the angle offset is an angle for a certain direction with respect to on a specific location or direction with absolute/relative coordinates known to the UE and the BS or location server. The angle offset may be indicated or configured to the UE.

3) The UE may request the BS or the location server to reconfigure the spatial relation information or to configure different spatial relation information. In this case, the configuration of the spatial relation information may be interpreted to cover not only information about DL RS resources or UL SRS resources transmitted from other cells/TPs but also information about the other cells/TPs.

4) The UE may use only cell/TP information in resource configuration information based on the spatial relation information. For example, in UE-based positioning, since information on a cell/TP is provided to the UE, the UE may determine the location of the cell/TP from ID information on the cell/TP, and the UE may determine a transmission (Tx) beam directed to the cell/TP. As another example, even if the UE fails to detect an RS transmitted from the cell/TP, the UE may use a successfully received DL RS resource among DL RS resources received from the cell/TP as an alternative for the spatial relation information because the UE knows that the information on the cell/TP has been configured. That is, the UE may detect a DL RS resource transmitted from the cell/TP based on only information on the cell/TP among the information on the cell/TP and the RS information, which are configured as the resource of the spatial relation information for the SRS resource, and use the detected DL RS resource for beam direction determination.

5) As a fallback operation (behavior) of the UE, the UE may use the maximum available power when transmitting the SRS resource. In addition, the fallback operation of the UE may be configured or indicated by the BS or location server, and power control of configuring the maximum available power when the UE transmits the SRS resource may be performed regardless of transmission beam directions of the UE.

6) The BS or location server may configure or instruct the UE to use a specific SRS resource ID of the UE and/or a specific DL RS resource ID transmitted from the serving cell/TP as a fallback configuration for the spatial relation information for the SRS resource.

Operation Method #4

When a path-loss reference configuration for power control that targets a neighboring cell/TP is different from a spatial relation information configuration for a transmission beam direction that targets the neighboring cell/TP, a problem may occur from the perspective of the UE in that the contents of information configured for SRS transmission are different from each other. Similarly, when a DL RS resource configured as path-loss reference for a specific SRS resource, which is transmitted from the neighboring cell/TP, is different from a DL RS resource configured by spatial relation information to perform transmission by targeting the neighboring cell/TP, the problem that the contents of information configured to the UE for SRS transmission are different from each other. Alternatively, even if the ID of a DL RS resource configured as path-loss reference for a specific SRS resource from a neighboring cell/TP is the same as the ID of a DL RS resource configured as spatial relation information to perform transmission by targeting the neighboring cell/TP, there may be a problem in that the configured DL RS resources are transmitted from different neighboring cells/TPs.

Hereinafter, how the UE operates when the above problems occur will be described. The SRS resource and/or SRS resource set mentioned below may be an SRS resource and/or SRS resource set configured to estimate the location of the UE. The SRS resource for UE positioning may be configured or indicated by the BS to the UE or configured or indicated by the location server/LMF to the UE. Therefore, the following UE operations may be configured or instructed by the BS or the location server/LMF. Additionally, the path-loss reference mentioned in this document may be configured to include not only information on a specific DL RS resource but also information on a specific cell/TP transmitting the corresponding DL RS resource in the form of physical cell ID(s)/TP ID(s), etc. Therefore, the path-loss reference including information such as cell ID(s)/TP ID(s) is important for UE positioning in that the UE may transmit SRSs to neighboring cells/TPs as well as the serving cell/TP.

(1) When the UE determines transmission power for transmitting a specific SRS resource or a prescribed SRS resource within a specific SRS resource set, the UE may fail to receive or detect a DL RS resource, which is configured by the BS or locater server as the path-loss reference, due to the reason that the received signal strength of the DL RS resource is too small to perform proper detection, etc., but the UE may succeed in receiving or detecting only a DL RS resource configured as the spatial relation information for determining the direction of a transmission beam for transmitting the SRS resource. For example, when the UE transmits a specific SRS resource, if the transmission beam of the UE is configured in a direction in which there are multiple cells/TPs existing in similar directions and if the UE is configured or instructed to determine the transmission power of the SRS based on a cell/TP that is the farthest among the multiple cells/TPs, the UE may not detect a DL RS resource for path-loss reference configured from the farthest cell/TP due to weak reception strength. In this case, the UE or BS/location server may perform the following operations.

For example, the UE may notify the BS/location server that the UE receives the DL RS resource configured as the spatial relation information without properly receiving or detecting the path-loss reference RS used for determining the transmission power for transmitting the SRS resource.

As another example, the UE may request to reconfigure or re-indicate the path-loss reference for the SRS resource or to update the path-loss reference for the SRS resource.

As another example, the UE may use information on the DL RS resource configured as the spatial relation information for the SRS resource and/or information on the cell/TP that transmits the DL RS resource, as the path-loss reference for determining the transmission power for transmitting the SRS resource. In addition, the UE may be configured or instructed by the BS/location server to perform the above operation.

As another example, since the UE knows one or more neighboring cells/TPs to transmit the SRS resource and transmission beam direction(s) although the UE fails to receive or detect the path-loss reference for determining the transmission power for transmitting the SRS resource, the UE may transmit the SRS resource with the maximum power available to the UE. Alternatively, the UE may apply a specific power offset to the transmission power of the SRS resource determined based on the serving cell/TP or the reference cell/TP and then transmit the SRS resource with power higher than the transmission power of the SRS resource determined based on the serving cell/TP or the reference cell/TP by the specific power offset. In this case, the BS/location server may configure or instruct the UE to use the power offset by default in the above situation in which the UE fails to receive or detect the path-loss reference but knows the transmission beam direction and the one or more neighboring cells/TPs to which the UE transmits the SRS resource. Alternatively, if the UE reports the above situation in which the UE fails to receive or detect the path-loss reference but knows the transmission beam direction(s) and the one or more neighboring cells/TPs to which the UE transmits the SRS resource, the BS/location server may configure or indicate the power offset. In addition, the BS/location server may also configure or instruct the UE to use the above-described power offset to determine the SRS transmission power.

As another example, the UE may determine the direction of transmitting the SRS resource according to the configuration of the spatial relation information and determine the transmission power for transmitting the SRS resource based on a specific RS such as an SSB from the serving cell. The above UE operation may be configured or instructed by the BS/location server.

As a further example, the UE may transmit no SRS resource. That is, the UE may transmit the SRS resource with zero power. This operation may also be configured or instructed by the BS/location server to the UE. In this case, since the location server uses the SRS resource to measure relative time of arrival (RTOA), etc., the UE may need to inform the BS/location server that no SRS resource is transmitted.

(2) On the contrary, when the UE determines transmission power for transmitting a specific SRS resource or a prescribed SRS resource within a specific SRS resource set, the UE may succeed in receiving or detecting a DL RS resource configured as the path-loss reference, but the UE may fail to receive or detect a DL RS resource configured as the spatial relation information for determining the direction of a transmission beam for transmitting the SRS resource.

For example, the UE may notify the BS/location server that the UE receives a path-loss reference signal used to determine the transmission power for transmitting the SRS resource without receiving the DL RS resource configured as the spatial relation information.

As another example, the UE may request to reconfigure or re-indicate the spatial relation information for the SRS resource or to update the spatial relation information for the SRS resource.

As another example, the UE may use information on the DL RS resource configured as the path-loss reference for determining the transmission power for transmitting the SRS resource and/or information on the cell/TP in which the DL RS resource is transmitted, as the spatial relation information on the SRS resource. In addition, the UE may be configured or instructed by the BS/location server to perform the above operation.

As another example, the UE may determine the direction of transmitting the SRS resource based on a specific RS such as an SSB from the serving cell. The above UE operation may be configured or instructed by the BS/location server.

As a further example, the UE may transmit no SRS resource. That is, the UE may transmit the SRS resource with zero power. This operation may also be configured or instructed by the BS/location server to the UE. If the UE transmits the SRS resource to a neighboring cell/TP in an incorrect direction, the actual transmission target cell/TP may not properly receive the SRS resource, and the SRS resource transmission may cause unnecessary interference, whereby it may be reasonable to transmit the SRS resource with zero power depending on situations.

(3) Additionally, when the UE determines transmission power for transmitting a specific SRS resource or a prescribed SRS resource within a specific SRS resource set, the UE may fail to receive or detect a DL RS resource configured as the path-loss reference and also fail to receive or detect a DL RS resource configured as the spatial relation information.

For example, the UE may not transmit the SRS resource, and the BS/location server may indicate the operation of the UE. That is, if the UE fails to receive both the DL RS resource configured as the spatial relation information for the SRS resource and the DL RS resource used as the path-loss reference for the SRS resource, the UE may be instructed or configured not to transmit the SRS resource. In addition, the operation in which the UE transmits no SRS may be defined to be performed by default when the UE fails to receive both the DL RS resource configured as the spatial relation information and the DL RS resource used as the path-loss reference for the SRS resource. The UE may report to the BS/location server that the UE transmits no SRS resources.

As another example, the UE may transmit the SRS resource with the maximum available transmission power in a specific direction arbitrarily selected by the UE or by assuming a specific DL RS resource as a source resource of the spatial relation information.

The above-described embodiments and contents may be organized in relation to the contents of the NR standardization discussion. In the previous NR standardization discussion, it is agreed that when the UE is incapable of obtaining path-loss reference configurations for neighboring cells/TPs, a fallback procedure in which only open-loop power control is supported may be supported for the UE. That is, when the UE is provided with path-loss reference from a serving cell or a neighboring cell in an SRS configuration for positioning, if the UE is incapable of properly measuring PL from the provided path-loss reference, the UE may use, as the path-loss reference, an RS resource obtained from an SSB that is used as a PL RS for MIB reception.

As in the previous NR standardization discussion, if the UE is incapable of obtaining path-loss reference configurations for neighboring cells/TPs, it would be reasonable that the UE allocates higher transmission power to transmit an SRS resource to the neighboring cells/TPs.

Even if the SRS resource is transmitted on a narrow transmission (Tx) beam, the SRS resource may be received by a plurality of cells/TPs existing in similar directions from the UE. The UE may be instructed to transmit an SRS resource intended for the plurality of cells/TPs, but all of these cells/TPs may not detect the corresponding SRS resource. The UE may be configured with a DL RS resource as a resource of spatial relation information for determining the transmission beam direction. In addition, the UE may also be configured with another DL RS resource as path-loss reference for calculating PL.

According to a recent NR standardization discussion, although the UE properly detects a DL RS resource from a neighboring cell/TP as a resource of spatial relation information for transmitting an SRS resource, the UE may need to use an SSB received from the serving cell when calculating PL if the UE is incapable of properly obtaining the measurement result for a DL RS resource configured as path-loss reference for determining the transmission power of the SRS resource.

When the UE is capable of receiving the DL RS resource as the resource of spatial relation information for transmitting the SRS resource from the neighboring cell/TP, the UE may need to transmit the SRS resource by allocating high transmission power compared to when transmitting the SRS resource to the serving cell even if the UE is incapable of obtaining the measurement result for the DL RS resource configured as the path-loss reference. Simply, for example, the UE may transmit the SRS resource with the maximum available transmission power.

Additionally, when the UE fails to receive a DL RS resource as a resource of spatial relation information for transmitting an SRS resource from a neighboring cell/TP, it may be difficult for the UE to determine a transmission beam direction. If the UE transmits the SRS resource in an arbitrary direction without determining the transmission beam direction, it is expected that a target cell/TP will not be able to receive the SRS resource. Thus, it may be inappropriate that the UE performs SRS transmission in this case. Therefore, the UE may need to inform the BS that the UE has not received the DL RS resource as the resource of the spatial relation information for transmitting the SRS resource from the neighboring cell/TP. Upon recognizing that the UE has not properly acquired the spatial relation information, the BS may reconfigure the spatial relation information for the UE to transmit the SRS resource.

In 3GPP TS Rel.16 38.331, the details of the aforementioned SRS resource configuration and spatial relation information are handled by SRS-config as follows.

```
-- ASN1START
-- TAG-SRS-CONFIG-START
SRS-Config ::=              SEQUENCE {
    srs-ResourceSetToReleaseList        SEQUENCE (SIZE(1..maxNrofSRS-
ResourceSets)) OF SRS-ResourceSetId        OPTIONAL, -- Need N
    srs-ResourceSetToAddModList             SEQUENCE (SIZE(1..maxNrofSRS-
ResourceSets)) OF SRS-ResourceSet          OPTIONAL, -- Need N
    srs-ResourceToReleaseList           SEQUENCE (SIZE(1..maxNrofSRS-
Resources)) OF SRS-ResourceId              OPTIONAL, -- Need N
    srs-ResourceToAddModList                SEQUENCE (SIZE(1..maxNrofSRS-
Resources)) OF SRS-Resource                OPTIONAL, -- Need N
    tpc-Accumulation                    ENUMERATED {disabled}
OPTIONAL, -- Need S
    ...,
    [[
    ...
SRS-ResourceSet ::=         SEQUENCE {
    srs-ResourceSetId               SRS-ResourceSetId,
    srs-ResourceIdList              SEQUENCE (SIZE(1..maxNrofSRS-
ResourcesPerSet)) OF SRS-ResourceId        OPTIONAL, -- Cond Setup
    resource Type                   CHOICE {
        aperiodic                   SEQUENCE {
            aperiodicSRS-ResourceTrigger            INTEGER (1..maxNrofSRS-
TriggerStates-1),
            csi-RS                  NZP-CSI-RS-ResourceId
OPTIONAL, -- Cond NonCodebook
            slotOffset              INTEGER (1..32)
OPTIONAL, -- Need S
            ...,
            [[
            aperiodicSRS-ResourceTriggerList            SEQUENCE
(SIZE(1..maxNrofSRS-TriggerStates-2))
                                        OF INTEGER (1..maxNrofSRS-TriggerStates-
1) OPTIONAL -- Need M
            ]]
        },
        semi-persistent             SEQUENCE {
            associatedCSI-RS                    NZP-CSI-RS-ResourceId
OPTIONAL, -- Cond NonCodebook
            ...
        },
        periodic                    SEQUENCE {
            associatedCSI-RS                    NZP-CSI-RS-ResourceId
OPTIONAL, -- Cond NonCodebook
            ...
        }
    },
    usage                       ENUMERATED {beamManagement, codebook,
nonCodebook, antennaSwitching},
    alpha                       Alpha                                       OPTIONAL, --
Need S
    p0                          INTEGER (-202..24)
OPTIONAL, -- Cond Setup
    pathlossReferenceRS                 PathlossReferenceRS-Config
OPTIONAL, -- Need M
    srs-PowerControlAdjustmentStates            ENUMERATED { sameAsFci2,
separateClosedLoop}         OPTIONAL, -- Need S
    ...,
    [[
    pathlossReferenceRS-List-r16            SEQUENCE (SIZE(1..maxNrofSRS-
PathlossReferenceRS-r16-1)) OF PathlossReferenceRS-Config
                                                                                OPTIONAL --
Need M
    ]]
}
...
SRS-PosResourceSet-r16 ::=          SEQUENCE {
    srs-PosResourceSetId-r16            SRS-PosResourceSetId-r16,
    srs-PosResourceIdList-r16           SEQUENCE (SIZE(1..maxNrofSRS-
ResourcesPerSet)) OF SRS-PosResourceId-r16
                                                                OPTIONAL, --
```

```
Cond Setup
    resourceType-r16                    CHOICE {
      aperiodic-r16                     SEQUENCE {
        aperiodicSRS-ResourceTriggerList-r16            SEQUENCE
(SIZE(1..maxNrofSRS-TriggerStates-1))
                                                        OF INTEGER (1..maxNrofSRS-TriggerStates-
1) OPTIONAL, -- Need M
        slotOffset-r16                  INTEGER (1..32)
OPTIONAL, -- Need S
        ...
      },
      semi-persistent-r16               SEQUENCE {
        ...
      },
      periodic-r16                      SEQUENCE {
        ...
      }
    },
    alpha-r16                           Alpha                                           OPTIONAL,
-- Need S
    p0-r16                  INTEGER (–202..24)
OPTIONAL, -- Cond Setup
    pathlossReferenceRS-Pos-r16         CHOICE {
      ssb-Index-16                      SSB-Index,
      csi-RS-Index-r16                  NZP-CSI-RS-ResourceId,
      ssb-r16                           SSB-InfoNcell-r16,
      dl-PRS-r16                        DL-PRS-Info-r16
OPTIONAL, --
  }
Need M
  ...
}
SRS-ResourceSetId ::=                   INTEGER (0..maxNrofSRS-ResourceSets-1)
SRS-PosResourceSetId-r16 ::=            INTEGER (0..maxNrofSRS-PosResourceSets-
1-r16)
SRS-Resource ::=            SEQUENCE {
  srs-ResourceId            SRS-ResourceId,
  nrofSRS-Ports             ENUMERATED {port1, ports2, ports4},
  ptrs-PortIndex            ENUMERATED {n0, n1 }
OPTIONAL, -- Need R
  transmissionComb                      CHOICE {
    n2                      SEQUENCE {
      combOffset-n2                     INTEGER (0..1),
      cyclicShift-n2                    INTEGER (0..7)
    },
    n4                      SEQUENCE {
      combOffset-n4                     INTEGER (0..3),
      cyclicShift-n4                    INTEGER (0..11)
    }
  },
  resourceMapping           SEQUENCE {
    startPosition           INTEGER (0..5),
    nrofSymbols             ENUMERATED {n1, n2, n4},
    repetitionFactor        ENUMERATED {n1, n2, n4}
  },
  freqDomainPosition        INTEGER (0..67),
  freqDomainShift           INTEGER (0..268),
  freqHopping               SEQUENCE {
    c-SRS                   INTEGER (0..63),
    b-SRS                   INTEGER (0..3),
    b-hop                   INTEGER (0..3)
  },
  groupOrSequenceHopping                ENUMERATED { neither, groupHopping,
sequenceHopping },
  resource Type                         CHOICE {
    aperiodic                           SEQUENCE {
      ...
    },
    semi-persistent                     SEQUENCE {
      periodicity AndOffset-sp          SRS-PeriodicityAndOffset,
      ...
    },
    periodic                SEQUENCE {
      periodicity AndOffset-p                       SRS-PeriodicityAndOffset,
      ...
    }
  },
  sequenceId                INTEGER (0..1023),
  spatialRelationInfo       SRS-SpatialRelationInfo
```

-continued

```
OPTIONAL, -- Need R
  ...,
  [[
  resourceMapping-r16                    SEQUENCE {
    startPosition-r16                      INTEGER (0..13),
    nrofSymbols-r16                        ENUMERATED {n1, n2, n4},
    repetitionFactor-r16                   ENUMERATED {n1, n2, n4}
  }                                                                OPTIONAL -- Need R
  ]]
}
SRS-PosResource-r16 ::=                  SEQUENCE {
  srs-PosResourceId-r16                    SRS-PosResourceId-r16,
  transmissionComb-r16                     CHOICE{
    n2-r16                                 SEQUENCE {
      combOffset-n2-r16                      INTEGER (0..1),
      cyclicShift-n2-r16                     INTEGER (0..7)
    },
    n4-r16                                 SEQUENCE {
      combOffset-n4-16                       INTEGER (0..3),
      cyclicShift-n4-r16                     INTEGER (0..11)
    },
    n8-r16                                 SEQUENCE {
      combOffset-n8-r16                      INTEGER (0..7),
      cyclicShift-n8-r16                     INTEGER (0..5)
    },
    ...
  },
  resourceMapping-r16                      SEQUENCE {
    startPosition-r16                        INTEGER (0..13),
    nrofSymbols-r16                          ENUMERATED {n1, n2, n4, n8, n12}
  },
  freqDomainShift-r16                      INTEGER (0..268),
  freqHopping-r16                          SEQUENCE {
    c-SRS-r16                                INTEGER (0..63)
  },
  groupOrSequenceHopping-r16               ENUMERATED { neither, groupHopping, sequenceHopping },
  resourceType-r16                         CHOICE {
    aperiodic-r16                            SEQUENCE {
      ...
    },
    semi-persistent-r16                    SEQUENCE {
      periodicity AndOffset-sp-r16             SRS-PeriodicityAndOffset-r16,
      ...
    },
    periodic-r16                           SEQUENCE {
      periodicity AndOffset-p-r16              SRS-PeriodicityAndOffset-r16,
      ...
    }
  },
  sequenceId-r16                           INTEGER (0..65535),
  spatialRelationInfoPos-r16               SRS-SpatialRelationInfoPos-r16
OPTIONAL, -- Need R
  ...
}
SRS-SpatialRelationInfo ::=              SEQUENCE {
  servingCellId                            ServCellIndex
OPTIONAL, -- Need S
  referenceSignal                          CHOICE {
    ssb-Index                                SSB-Index,
    csi-RS-Index                             NZP-CSI-RS-ResourceId,
    srs                                    SEQUENCE {
      resourceId                             SRS-ResourceId,
      uplinkBWP                              BWP-Id
    }
  }
}
SRS-SpatialRelationInfoPos-r16 ::=        SEQUENCE {
  servingCellId-r16                        ServCellIndex           OPTIONAL, -- Need S
  referenceSignal-r16                      CHOICE {
    ssb-IndexServing-r16                     SSB-Index,
    csi-RS-IndexServing-r16                  NZP-CSI-RS-ResourceId,
    srs-SpatialRelation-r16                SEQUENCE {
      resourceSelection-r16                  CHOICE {
        srs-ResourceId-r16                     SRS-ResourceId,
        srs-PosResourceId-r16                  SRS-PosResourceId-r16
      },
      uplinkBWP-r16                          BWP-Id
```

```
    },
    ssbNcell-r16            SSB-InfoNcell-r16,
    dl-PRS-r16              DL-PRS-Info-r16
  }
}
...
DL-PRS-Info-r16 ::=         SEQUENCE {
  trp-Id-r16                INTEGER (0..255),
  dl-PRS-ResourceSetId-r16            INTEGER (0..7),
  dl-PRS-ResourceId-r16               INTEGER (0..63)
OPTIONAL -- Cond Pathloss
}
SRS-ResourceId ::=                    INTEGER (0..maxNrofSRS-Resources-1)
SRS-PosResourceId-r16 ::=             INTEGER (0..maxNrofSRS-PosResources-1-
r16)
SRS-Periodicity AndOffset ::=         CHOICE {
  sl1             NULL,
  sl2             INTEGER(0..1),
  sl4             INTEGER(0..3),
  sl5             INTEGER(0..4),
  slL8            INTEGER(0..7),
  sl10            INTEGER(0..9),
  sl16            INTEGER(0..15),
  sl20            INTEGER(0..19),
  sl32            INTEGER(0..31),
  sl40            INTEGER(0..39),
  sl64            INTEGER(0..63),
  sl80            INTEGER(0..79),
  sl160           INTEGER(0..159),
  sl320           INTEGER(0..319),
  sl640           INTEGER(0..639),
  sl1280          INTEGER(0..1279),
  sl2560          INTEGER(0..2559)
}
SRS-Periodicity AndOffset-r16 ::=     CHOICE {
  sl1             NULL,
  sl2             INTEGER(0..1),
  sl4             INTEGER(0..3),
  sl5             INTEGER(0..4),
  sl8             INTEGER(0..7),
  sl10            INTEGER(0..9),
  sl16            INTEGER(0..15),
  sl20            INTEGER(0..19),
  sl32            INTEGER(0..31),
  sl40            INTEGER(0..39),
  sl64            INTEGER(0..63),
  sl80            INTEGER(0..79),
  sl160           INTEGER(0..159),
  sl320           INTEGER(0..319),
  sl640           INTEGER(0..639),
  sl1280          INTEGER(0..1279),
  sl2560          INTEGER(0..2559),
  sl5120          INTEGER(0..5119),
  sl10240         INTEGER(0..10239),
  sl40960         INTEGER(0..40959),
  sl81920         INTEGER(0..81919),
  ...
}
-- TAG-SRS-CONFIG-STOP
-- ASN1STOP
```

SRS-Config field descriptions tpc-Accumulation
If the field is absent, UE applies TPC commands via accumulation. If disabled, UE applies the TPC command without accumulation (this applies to SRS when a separate closed loop is configured for SRS) (see TS 38.213 [13], clause 7.3).

SRS-Resource field descriptions cyclicShift-n2
Cyclic shift configuration (see TS 38.214 [19], clause 6.2.1).
cyclicShift-n4
Cyclic shift configuration (see TS 38.214 [19], clause 6.2.1).
freqHopping Includes parameters capturing SRS frequency hopping (see TS 38.214 [19], clause 6.2.1). For CLI SRS-RSRP measurement the network always configures this field such that b-hop > b-SRS.
groupOrSequenceHopping
Parameter(s) for configuring group or sequence hopping (see TS 38.211 [16], clause 6.4.1.4.2). For CLI SRS-RSRP measurement, the network always configures this parameter to 'neither'.
nrofSRS-Ports
Number of ports. For CLI SRS-RSRP measurement, the network always configures this parameter to 'port1'.
periodicityAndOffset-p
Periodicity and slot offset for this SRS resource. All values are in "number of slots". Value sl1 corresponds to a periodicity 1 slot, value sl2 corresponds to a periodicity of 2 slots, and so on. For each periodicity the corresponding offset is given in number of slots. For periodicity sl1 the offset is 0 slots (see TS 38.214 [19], clause 6.2.1). For CLI SRS-RSRP measurement, sl1280 and sl2560 cannot be configured.
periodicityAndOffset-sp
Periodicity and slot offset for this SRS resource All values are in "number of slots". Value sl1 corresponds to a periodicity of 1 slot, value sl2 corresponds to a periodicity of 2 slots, and so on. For each periodicity the corresponding offset is given in number of slots. For periodicity sl1 offset is 0 slots (see TS 38.214 [19], clause 6.2.1).
ptrs-PortIndex
The PTRS port index for this SRS resource for non-codebook based UL MIMO. This is only applicable when the corresponding PTRS-UplinkConfig is set to CP-OFDM. The ptrs-PortIndex configured here must be smaller than the maxNrofPorts configured in the PTRS-UplinkConfig (see TS 38.214 [19], clause 6.2.3.1). This parameter is not applicable to CLI SRS-RSRP measurement.
resourceMapping
OFDM symbol location of the SRS resource within a slot including nrofSymbols (number of OFDM symbols). startPosition (value 0 refers to the last symbol, value 1 refers to the second last symbol, and so on) and repetitionFactor (see TS 38.214 [19], clause 6.2.1 and TS 38.211 [16], clause 6.4.1.4). The configured SRS resource does not exceed the slot boundary. If resourceMapping-r16 is signalled, UE shall ignore the resourceMapping (without suffix). For CLI SRS-RSRP measurement, the network always configures nrofSymbols and repetitionFactor to 'n1'.
resourceType
Periodicity and offset for semi-persistent and periodic SRS resource (see TS 38.214 [19], clause 6.2.1). For CLI SRS-RSRP measurement, only 'periodic' is applicable for resourceType.
sequenceId
Sequence ID used to initialize pseudo random group and sequence hopping (see TS 38.214 [19], clause 6.2.1).
spaitialRelationInfo
Configuration of the spatial relation between a reference RS and the target SRS. Reference RS can be SSB/CSI-RS/SRS (see TS 38.214 [19], clause 6.2.1). This parameter is not applicable to CLI SRS-RSRP measurement.
spatialRelationInfoPos
Configuration of the spatial relation between a reference RS and the target SRS. Reference RS can be SSB/CSI-RS/SRS/DL-PRS (see TS 38.214 [19], clause 6.2.1).
srs-RequestForDCI-Format0-2
Indicate tee number of bits for "SRS request" in DCI format 0_2. When the field is absent, then the value of 0 bit for "SRS request" in DCI format 0_2 is applied. If the parameter srs-RequestForDCI-Format0-2 is configured to value 1, 1 bit is used to indicate one of the first two rows of Table 7.3.1.1.2-24 in TS 38.212 [17] for triggered aperiodic SRS resource set. If the value 2 is configured, 2 bits are used to indicate one of the rows of Table 7.3.1.1.2-24 in TS 38.212 [17]. When UE is configured with supplementaryUplink, an extra bit (the first bit of the SRS request field) is used for the non-SUL/SUL indication.
cyclicShift-n2
Cyclic shift configuration (see TS 38.214 [19], clause 6.2.1)

The SRS mentioned in this document may be an SRS resource or a set of SRS resources configured or indicated for UE positioning. The configuration or indication of the SRS resource or SRS resource set may be provided by the BS and/or location server. In addition, the contents of spatial relation information as the configuration for SRS resources may be found in 3GPP TS 38.331 and 3GPP TS 38.214.

The various details, functions, procedures, proposals, methods, and/or operational flowcharts described in this document may be applied to a variety of fields that require wireless communication/connection (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 24:
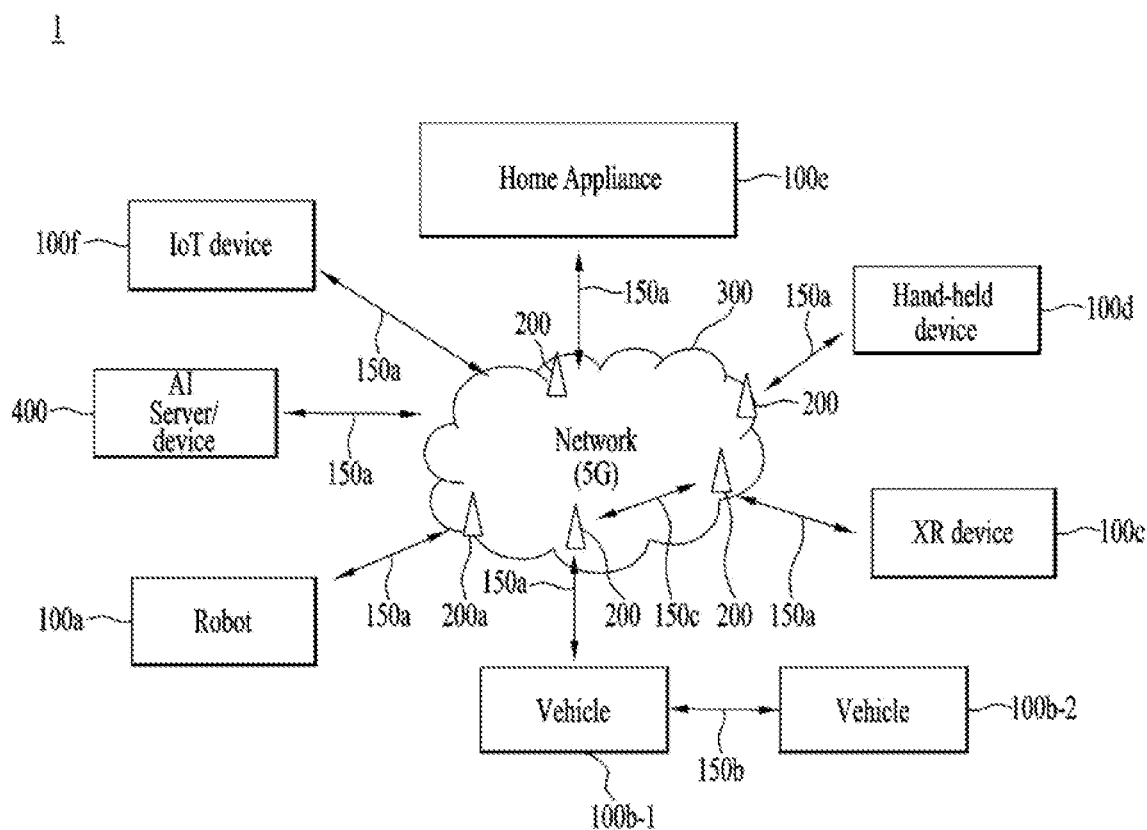
FIG. 24 illustrates an exemplary communication system to which embodiments of the present disclosure are applied.

FIG. 24 illustrates a communication system 1 applicable to the present disclosure.

Referring to FIG. 24, the communication system 1 applicable to the present disclosure includes wireless devices, BSs, and a network. Herein, the wireless device refers to a device performing communication based on a radio access technology (e.g., 5G NR, LTE, etc.) and may be referred to as a communication/radio/5G device. The wireless devices may include, but not limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality/virtual reality/mixed reality (AR/VR/MR) device and be implemented as a head-mounted device (HMD), a head-up display (HUD) mounted in vehicles, a television (TV), a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smart meter. For example, the network and BSs may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may include a 3G network, a 4G (e.g., LTE) network, or a 5G (e.g., NR) network. Although the wireless devices 100a to 100f may communicate with each other through the BSs/network 200/300, the wireless devices 100a to 100f may perform direct communication (e.g., sidelink communication) with each other without assistance from the BSs/network 200/300. For example, the vehicles 100b-1 and 100b-2 may perform direct communication (e.g. vehicle-to-vehicle/vehicle-to-everything (V2V/V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and BSs 200 or between one BS 200 and another BS 200. Herein, the wireless communication/connections may be established through various radio access technologies (e.g., 5G NR) such as UL/DL communication 150a, sidelink communication 150b (or device-to-device (D2D) communication), or inter-BS communication (e.g. relay, integrated access backhaul (IAB), etc.). The wireless devices and BSs may transmit/receive radio signals to/from each other through the wireless communication/connections 150a to 150c. For example, signals may be transmitted/received over various physical channels for the wireless communication/connections 150a to 150c. To this end, at least a part of various configuration information configuring processes, signal processing processes (e.g., channel encoding/decoding, modulation/demodulation, resource mapping/demapping, etc.), and resource allocating processes for radio signal transmission/reception may be performed based on various proposals of the present disclosure.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

The wireless communication technology implemented in the wireless devices of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

A specific operation described as performed by the BS may also be performed by an upper node of the BS. That is, it is apparent that various operations performed for communication with the UE may be performed by the BS or other network nodes rather than the BS in a network including a plurality of network nodes including the BS. The term 'base station' may be replaced with 'fixed station', 'Node B', 'eNode B (eNB)', 'gNode B (gNB)', 'access point (AP)', etc. The term 'terminal' may be replaced with 'user equipment (UE)', 'mobile station (MS)', 'mobile subscriber station (MSS)', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method by which a UE controls power of a sounding reference signal (SRS) in a wireless communication system and apparatus therefor have been described based the 5th generation (5G) new radio access technology (new RAT or NR) system, but the method and apparatus are applicable to various wireless communication systems including the 5G NR system.

The invention claimed is:

1. A method of controlling transmission power of a sounding reference signal (SRS) by a user equipment (UE) in a wireless communication system, the method comprising:

receiving a synchronization signal/physical broadcast channel (SS/PBCH) block including a primary synchronization signal (PSS), a secondary synchronization signal (SSS), and a physical broadcast channel (PBCH);

performing access to a serving cell based on system information included in the PBCH of the SS/PBCH block;

receiving a reference signal (RS) resource for obtaining path loss to be used for the transmission power of the SRS;

determining measurement regarding the path loss based on the RS resource; and controlling the transmission power of the SRS based on the determination of the measurement, wherein the RS resource is related to a neighbor cell, wherein based on success of the measurement for the RS resource, a measurement value of the path loss is used to control the transmission power, and wherein based on failure of the measurement for the RS resource, information related to a power configuration obtained from the serving cell is used to control the transmission power.

2. The method of claim 1, wherein based on the failure of the measurement for the RS resource, the SRS is not transmitted.

3. The method of claim 1, wherein based on the failure of the measurement for the RS resource, the transmission power is controlled by applying a power offset to SRS transmission power for the serving cell.

4. The method of claim 1, wherein the SRS is related to positioning of the UE.

5. The method of claim 1, further comprising receiving spatial relation information related to the RS resource, wherein the spatial relation information includes information regarding the neighbor cell.

6. The method of claim 5, wherein based on the failure of the measurement for the RS resource, the information regarding the neighbor cell included in the spatial relation information is used to determine a transmission beam of the SRS.

7. A user equipment (UE) configured to control transmission power of a sounding reference signal (SRS) in a wireless communication system, the UE comprising:

at least one transceiver;

at least one processor; and at least one memory operably connected to the at least one processor and configured to store instructions that, when executed, cause the at least one processor to perform operations comprising:

receiving a synchronization signal/physical broadcast channel (SS/PBCH) block including a primary synchronization signal (PSS), a secondary synchronization signal (SSS), and a physical broadcast channel (PBCH);

performing access to a serving cell based on system information included in the PBCH of the SS/PBCH block;

receiving a reference signal (RS) resource for obtaining path loss to be used for the transmission power of the SRS;

determining measurement regarding the path loss based on the RS resource; and controlling the transmission power of the SRS based on the determination of the measurement, wherein the RS resource is related to a neighbor cell, wherein based on success of the measurement for the RS resource, a measurement value of the path loss is used to control the transmission power, and wherein based on failure of the measurement for the RS resource, information related to a power configuration obtained from the serving cell is used to control the transmission power.

8. The UE of claim 7, wherein based on the failure of the measurement for the RS resource, the SRS is not transmitted.

9. The UE of claim 7, wherein based on the failure of the measurement for the RS resource, the transmission power is controlled by applying a power offset to SRS transmission power for the serving cell.

10. The UE of claim 7, wherein the SRS is related to positioning of the UE.

11. The UE of claim 7, wherein the operations further comprise receiving spatial relation information related to the RS resource, wherein the spatial relation information includes information regarding the neighbor cell.

12. The UE of claim 11, wherein based on the failure of the measurement for the RS resource, the information regarding the neighbor cell included in the spatial relation information is used to determine a transmission beam of the SRS.

13. An apparatus configured to control transmission power of a sounding reference signal (SRS) in a wireless communication system, the apparatus comprising:

at least one transceiver;

at least one processor; and at least one memory operably connected to the at least one processor and configured to store instructions that, when executed, cause the at least one processor to perform operations comprising:

receiving a synchronization signal/physical broadcast channel (SS/PBCH) block including a primary synchronization signal (PSS), a secondary synchronization signal (SSS), and a physical broadcast channel (PBCH);

performing access to a serving cell based on system information included in the PBCH of the SS/PBCH block;

receiving a reference signal (RS) resource for obtaining path loss to be used for the transmission power of the SRS;

determining measurement regarding the path loss based on the RS resource; and controlling the transmission power of the SRS based on the determination of the measurement, wherein the RS resource is related to a neighbor cell, wherein based on success of the measurement for the RS resource, a measurement value of the path loss is used to control the transmission power, and wherein based on failure of the measurement for the RS resource, information related to a power configuration obtained from the serving cell is used to control the transmission power.

14. A method of supporting control of transmission power of a sounding reference signal (SRS) by a network node in a wireless communication system, the method comprising:

transmitting a synchronization signal/physical broadcast channel (SS/PBCH) block including a primary synchronization signal (PSS), a secondary synchronization signal (SSS), and a physical broadcast channel (PBCH);

transmitting a reference signal (RS) resource related to path loss to be used for the transmission power of the SRS; and receiving the SRS, wherein the RS resource is related to a neighbor cell, wherein the RS resource is used to measure the path loss, wherein based on success of the measurement regarding the path loss for the RS resource, the transmission power of the SRS is determined based on a measurement value of the path loss, and wherein based on failure of the measurement regarding the path loss for the RS resource, the transmission power of the SRS is determined based on information related to a power configuration from a serving cell.

15. A network node configured to support control of transmission power of a sounding reference signal (SRS) in a wireless communication system, the network node comprising:
at least one transceiver;
at least one processor; and
at least one memory operably connected to the at least one processor and configured to store instructions that, when executed, cause the at least one processor to perform operations comprising:
transmitting a synchronization signal/physical broadcast channel (SS/PBCH) block including a primary synchronization signal (PSS), a secondary synchronization signal (SSS), and a physical broadcast channel (PBCH);
transmitting a reference signal (RS) resource related to path loss to be used for the transmission power of the SRS; and
receiving the SRS,
wherein the RS resource is related to a neighbor cell,
wherein the RS resource is used to measure the path loss,
wherein based on success of the measurement regarding the path loss for the RS resource, the transmission power of the SRS is determined based on a measurement value of the path loss, and
wherein based on failure of the measurement regarding the path loss for the RS resource, the transmission power of the SRS is determined based on information related to a power configuration from a serving cell.

16. A non-transitory computer-readable storage medium configured to store at least one computer program comprising instructions that, when executed by at least one processor, cause the at least one processor to perform operations for a user equipment (UE), the operations comprising: receiving a synchronization signal/physical broadcast channel (SS/PBCH) block including a primary synchronization signal (PSS), a secondary synchronization signal (SSS), and a physical broadcast channel (PBCH); performing access to a serving cell based on system information included in the PBCH of the SS/PBCH block; receiving a reference signal (RS) resource for obtaining path loss to be used for the transmission power of the SRS; determining measurement regarding the path loss based on the RS resource; and controlling the transmission power of the SRS based on the determination of the measurement, wherein the RS resource is related to a neighbor cell, wherein based on success of the measurement for the RS resource, a measurement value of the path loss is used to control the transmission power, and wherein based on failure of the measurement for the RS resource, information related to a power configuration obtained from the serving cell is used to control the transmission power.

* * * * *